US012719965B2

(12) United States Patent
Chen

(10) Patent No.: US 12,719,965 B2
(45) Date of Patent: Aug. 25, 2026

(54) DATA PROCESSING METHOD BASED ON BLOCKCHAIN, COMPUTER DEVICE, AND STORAGE MEDIUM

(71) Applicant: TENCENT TECHNOLOGY (SHENZHEN) COMPANY LIMITED, Shenzhen (CN)

(72) Inventor: Zimin Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 236 days.

(21) Appl. No.: 18/744,104

(22) Filed: Jun. 14, 2024

(65) Prior Publication Data

US 2024/0333814 A1 Oct. 3, 2024

Related U.S. Application Data

(63) Continuation of application No. PCT/CN2023/117936, filed on Sep. 11, 2023.

(30) Foreign Application Priority Data

Oct. 26, 2022 (CN) ......................... 202211319128.5

(51) Int. Cl.
*H04L 67/563* (2022.01)
*G06F 21/10* (2013.01)

(52) U.S. Cl.
CPC .......... *H04L 67/563* (2022.05); *G06F 21/108* (2023.08)

(58) Field of Classification Search
CPC ............................. H04L 67/563; G06F 21/108
(Continued)

(56) References Cited

U.S. PATENT DOCUMENTS

2017/0244707 A1* 8/2017 Johnsrud ................. H04L 63/08
2020/0249853 A1* 8/2020 Dintenfass .......... G06F 13/1668

FOREIGN PATENT DOCUMENTS

CN 110891086 A * 3/2020 ........... H04L 67/563
CN 111275415 A * 6/2020 ........... G06Q 20/102
(Continued)

OTHER PUBLICATIONS

The World Intellectual Property Organization (WIPO) International Search Report for PCT/CN2023/117936 Nov. 28, 2023 5 Pages (including translation).

*Primary Examiner* — Glenford J Madamba
(74) *Attorney, Agent, or Firm* — Anova Law Group, PLLC

(57) ABSTRACT

A data processing method based on a blockchain includes creating a target stream-resource transfer channel for a stream-resource channel creation request in the blockchain based on a stream-resource transfer contract in the blockchain, the stream-resource channel creation request comprising a target object address pair, and the target stream-resource transfer channel providing, for the target object address pair, a function of performing stream-resource transfer based on the stream-resource transfer contract; obtaining a historical stream-resource transfer channel comprising a historical object address pair, the target object address pair and the historical object address pair sharing at least one identical object address; combining the historical stream-resource transfer channel and the target stream-resource transfer channel to obtain an update stream-resource transfer channel, the update stream-resource transfer channel comprising an update object address pair; and performing, according to the update stream-resource transfer channel, stream-resource transfer processing associated with the update object address pair.

20 Claims, 11 Drawing Sheets

(58) Field of Classification Search
USPC .......................................................... 709/203
See application file for complete search history.

(56) References Cited

FOREIGN PATENT DOCUMENTS

| | | | | | |
|---|---|---|---|---|---|
| CN | 114648332 | A | * | 6/2022 | ........... G06Q 20/381 |
| WO | WO-2022141770 | A1 | * | 7/2022 | ......... G06Q 20/3825 |

* cited by examiner

DATA PROCESSING METHOD BASED ON BLOCKCHAIN, COMPUTER DEVICE, AND STORAGE MEDIUM

CROSS-REFERENCES TO RELATED APPLICATIONS

This application is a continuation application of PCT Patent Application No. PCT/CN2023/117936, filed on Sep. 11, 2023, which claims priority to Chinese Patent Application No. 202211319128.5, filed on Oct. 26, 2022, all of which is incorporated herein by reference in their entirety.

FIELD OF THE TECHNOLOGY

The present application relates to the field of internet technologies and, in particular, to a data processing method and apparatus based on a blockchain, a device, a storage medium, and a program product.

BACKGROUND OF THE DISCLOSURE

With the rapid development of network technologies and the emphasis of enterprises on data security, blockchains are widely used. When a large number of resources need to be transferred, a virtual resource transfer interface on a blockchain needs to be called regularly and continuously, and a transaction on a chain, such as salary transfer between employers and employees, and personal tax transfer between employees and the tax bureau, needs to be formed in each cycle.

Through the stream-resource transfer method, shortcomings of periodic resource transfer on a chain can be effectively solved. For example, periodic resources may be transactions submitted for each resource transfer or may be handling fees paid for each transaction. However, with the widespread applications of the stream-resource transfer method, the number of stream-resource transfers on a chain increases day by day, resulting in an increase in the complexity of stream-resource transfers on the chain, thereby reducing the efficiency of stream-resource transfers.

SUMMARY

One embodiment of the present application provides a data processing method based on a blockchain. The method includes creating a target stream-resource transfer channel for a stream-resource channel creation request in the blockchain based on a stream-resource transfer contract in the blockchain, the stream-resource channel creation request comprising a target object address pair, and the target stream-resource transfer channel providing, for the target object address pair, a function of performing stream-resource transfer based on the stream-resource transfer contract; obtaining, in the blockchain according to the target object address pair, a historical stream-resource transfer channel comprising a historical object address pair, the target object address pair and the historical object address pair sharing at least one identical object address; combining the historical stream-resource transfer channel and the target stream-resource transfer channel to obtain an update stream-resource transfer channel, the update stream-resource transfer channel comprising an update object address pair; and performing, according to the update stream-resource transfer channel, stream-resource transfer processing associated with the update object address pair.

Another embodiment of the present application provides a computer device. The computer device includes at least one processor, a memory, and a network interface, the at least one processor being connected to the memory and the network interface, the network interface being configured to provide a data communication function, the memory being configured to store computer programs, and the at least one processor being configured to call the computer programs so that the computer device performs creating a target stream-resource transfer channel for a stream-resource channel creation request in the blockchain based on a stream-resource transfer contract in the blockchain, the stream-resource channel creation request comprising a target object address pair, and the target stream-resource transfer channel providing, for the target object address pair, a function of performing stream-resource transfer based on the stream-resource transfer contract; obtaining, in the blockchain according to the target object address pair, a historical stream-resource transfer channel comprising a historical object address pair, the target object address pair and the historical object address pair sharing at least one identical object address; combining the historical stream-resource transfer channel and the target stream-resource transfer channel to obtain an update stream-resource transfer channel, the update stream-resource transfer channel comprising an update object address pair; and performing, according to the update stream-resource transfer channel, stream-resource transfer processing associated with the update object address pair.

Another embodiment of the present application provides a non-transitory computer-readable storage medium storing computer programs that, when being executed, causes the at least one processor to perform: creating a target stream-resource transfer channel for a stream-resource channel creation request in the blockchain based on a stream-resource transfer contract in the blockchain, the stream-resource channel creation request comprising a target object address pair, and the target stream-resource transfer channel providing, for the target object address pair, a function of performing stream-resource transfer based on the stream-resource transfer contract; obtaining, in the blockchain according to the target object address pair, a historical stream-resource transfer channel comprising a historical object address pair, the target object address pair and the historical object address pair sharing at least one identical object address; combining the historical stream-resource transfer channel and the target stream-resource transfer channel to obtain an update stream-resource transfer channel, the update stream-resource transfer channel comprising an update object address pair; and performing, according to the update stream-resource transfer channel, stream-resource transfer processing associated with the update object address pair.

BRIEF DESCRIPTION OF THE DRAWINGS

To describe the technical solutions of the embodiments of the present application more clearly, the following briefly introduces the accompanying drawings required for describing the embodiments. Apparently, the accompanying drawings in the following description show only some embodiments of the present application, and a person of ordinary skill in the art may still derive other drawings from these accompanying drawings without creative efforts.

DESCRIPTION OF EMBODIMENTS

Figure 1:
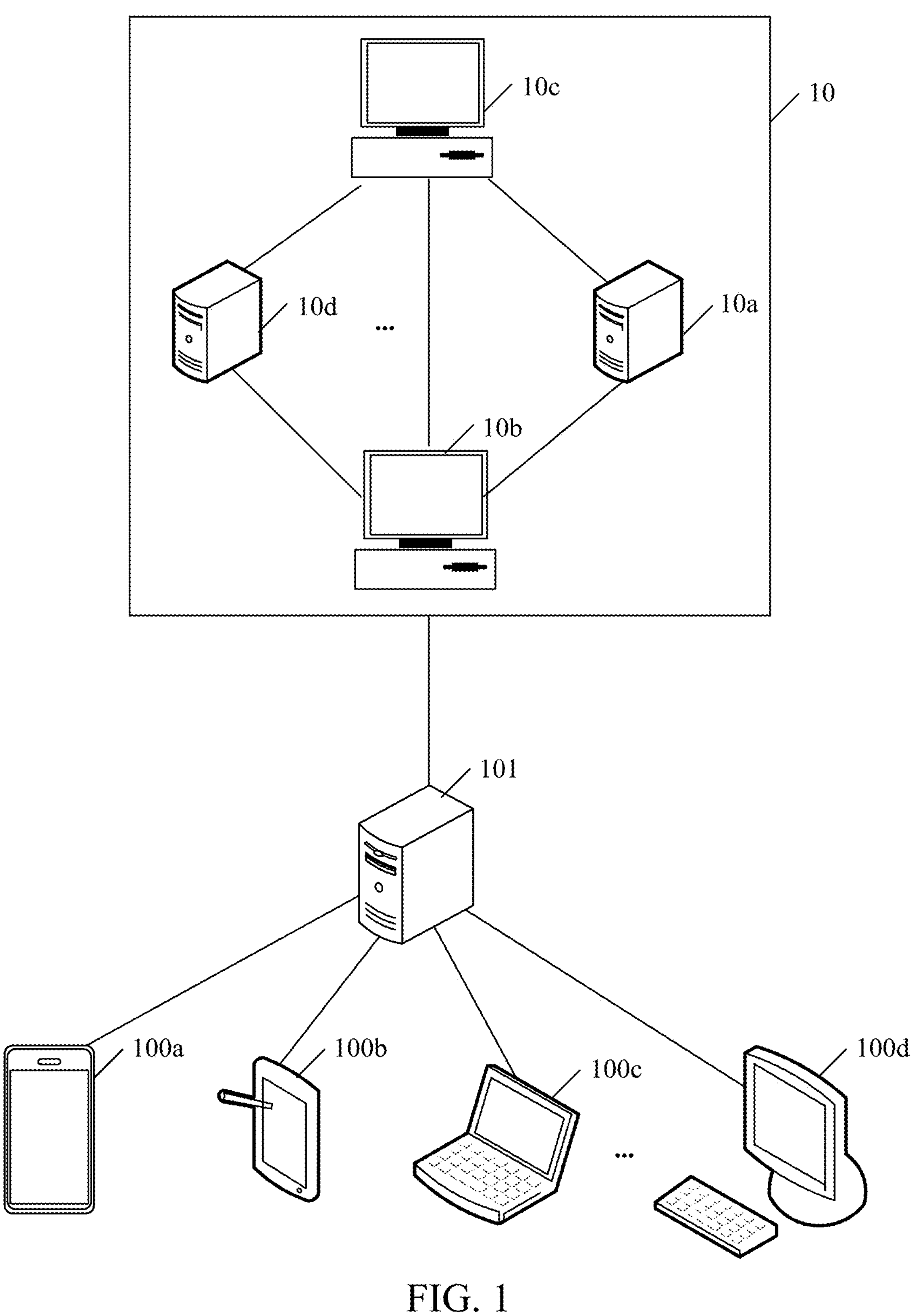
FIG. 1 is a schematic diagram of a system architecture according to an embodiment of the present application.

The technical solutions of the embodiments of the disclosure will be described below clearly and comprehensively in conjunction with accompanying drawings of the embodiments of the disclosure. Apparently, the embodiments described are merely some of, rather than all of, the embodiments of the disclosure. All other embodiments obtained by a person of ordinary skill in the art based on the embodiments of the present application without creative efforts shall fall within the protection scope of the present application.

To facilitate understanding, some nouns are described below:

1. Blockchain: In a narrow sense, a blockchain is a chained data structure with blocks as the basic unit, and digital summaries are used in blocks to verify previously obtained transaction history, which is suitable for needs of tamper resistance and scalability in distributed accounting scenarios. In a broad sense, a blockchain also refers to a distributed accounting technology implemented through a blockchain structure, including distributed consensus, privacy and security protection, point-to-point communication technologies, network protocols, smart contracts, or the like.

The goal of the blockchain is to achieve a distributed data recording ledger that only allows addition and no deletion. The basic structure of the underlying ledger is a linear linked list. The linked list includes “blocks” connected in series. A hash value of a previous block is recorded in a subsequent block. Whether each block (and transactions in the block) is legal can be quickly verified by calculating the hash value. If a node in a network proposes to add a new block, consensus on the block needs to be reached through the consensus mechanism.

2. Block: A block is a data packet that carries transaction data on the blockchain network. A block is a data structure marked with a timestamp and a hash value corresponding to the previous block. The block verifies and confirms a transaction in the block through the consensus mechanism of the network. A block includes a block header and a block body. The block header can record meta-information of a current block, including data such as a current version number, a hash value corresponding to a previous block, a timestamp, a random number, and a hash value of a Merkle root.

The block body can record detailed data generated over a period of time, including all transaction records or other information verified by the current block and generated during a block creation process, and can be understood as a form of representation of a ledger. In addition, the detailed data of the block body may include that a unique Merkle root is generated through the hashing process of the Merkle tree and recorded in the block header.

A previous block is also called a parent block, and the blockchain achieves temporal ordering by recording the hash value corresponding to the block and the hash value corresponding to the parent block in the block header.

3. Blockchain node: A blockchain network divides nodes into consensus nodes (which may also be referred to as core nodes) and synchronization nodes (which may include data nodes and light nodes). The consensus node is responsible for the consensus service of the entire blockchain network. The synchronization node is responsible for synchronizing ledger information of the consensus node, that is, synchronizing the latest block data. The internal structure of either the consensus node or the synchronization node includes network communication components, because the blockchain network is essentially a peer-to-peer (P2P) network and P2P components are needed to communicate with other nodes in the blockchain network. Resources and services in the blockchain network are scattered on various nodes, and the transmission of information and the implementation of services are performed directly between nodes without the intervention of intermediate links or centralized servers (third parties).

4. Public key and private key: A public key and a private key are a key pair (that is, one public key and one private key) obtained through an algorithm. The public key is the public part of the key pair, and the private key is the non-public part. The public key is commonly used to encrypt data, verify digital signatures, or the like. This algorithm can ensure that the obtained key pair is unique. When using this key pair, if one of the keys is used to encrypt a piece of data, the other key needs to be used to decrypt the data. For example, if the public key is used to encrypt the data, the private key needs to be used to decrypt the data, and if the private key is used to encrypt the data, the public key needs to be used to decrypt the data; otherwise, the decryption does not succeed.

5. Asymmetric signature: A signature algorithm includes two keys: the public key and the private key. The public key and the private key are a pair. If the private key is used to sign the data, the corresponding public key needs to be used to verify the signature of the data. Because the signature process and the signature verification process use two different keys, this algorithm is called asymmetric signature. The basic process of implementing confidential information exchange through asymmetric signature may be: A party A generates a key pair and makes the public key public. When needing to send a message to another party (a party B), the party A uses its own private key to sign the confidential message and then sends the message to the party B. The party B then uses the public key of the party A to verify the signed message.

6. Smart contract: A smart contract is a computer protocol designed to communicate, verify, or execute contracts in an information-based manner. In the blockchain system, a smart contract is a code that may be understood and executed by each node of the blockchain. Any logic may be executed and a result may be obtained. In practical applications, a smart contract is managed and tried through transactions on the blockchain. Each transaction is equivalent to a remote procedure call (RPC) request of the blockchain system. If a smart contract is equivalent to an executable program, the blockchain is equivalent to an operating system that provides a running environment. The blockchain may include multiple contracts that are distinguished by contract identities (ID), identification numbers, or names. In the embodiments of the present application, a stream-resource transfer contract is a smart contract.

7. Stream-resource transfer: that is, stream payment. Stream-resource transfer is implemented through smart contracts and programming of digital assets (also referred to as virtual resources). Stream-resource transfer defines a directional relationship between two object addresses (a stream-resource transfer-out address and a stream-resource transfer-in address). A stream-resource is created from the stream-resource transfer-out address, and continues to flow to the stream-resource transfer-in address according to a transfer rate per unit time (for example, per second or per hour).

FIG. 1 is a schematic diagram of a system architecture according to an embodiment of the present application. As shown in FIG. 1, the system architecture may include a service server 101, a terminal device cluster 100, and a blockchain network.

The blockchain network may include a blockchain node cluster 10 with consensus permission, and the blockchain node cluster 10 may include one or more blockchain nodes. This embodiment of the present application does not limit the number of blockchain nodes in the blockchain node cluster 10. As shown in FIG. 1, the blockchain node cluster 10 may include a blockchain node 10*a*, a blockchain node 10*b*, a blockchain node 10*c*, and a blockchain node 10*d*. When working normally, each blockchain node may receive a transaction request (for example, a stream-resource channel creation request in this embodiment of the present application) sent by off-chain devices (for example, the service server 101 and the terminal device in the terminal device cluster 100 in this embodiment of the present application), and generate a block based on the received transaction request and then put the block on the chain.

In specific implementations of the present application, related data such as user information (for example, a stream-resource channel creation request and a target object address pair) is involved, and when the embodiments of the present application are applied to a specific product or technology, it is necessary to obtain user permission or consent, and the collection, usage, and processing of related data need to comply with relevant laws, regulations and standards of relevant countries and regions.

To ensure data interoperability between various blockchain nodes, there may be a data connection between blockchain nodes. For example, there is a data connection between the blockchain node 10*a* and the blockchain node 10*c*, there is a data connection between the blockchain node 10*a* and the blockchain node 10*d*, and there is a data connection between the blockchain node 10*b* and the blockchain node 10*c*.

Data or block transmission may be performed between blockchain nodes through the data connection. The data connection between the blockchain nodes may be based on node identifiers. Each blockchain node in the blockchain network has a corresponding node identifier, and each blockchain node may store node identifiers of other blockchain nodes that are connected to the blockchain node, so that obtained data or generated blocks may be subsequently broadcast to other blockchain nodes based on node identifiers of the other blockchain nodes. For example, the blockchain node 10*a* may maintain a node identifier list, which stores node names and node identifiers of other blockchain nodes, as shown in Table 1.

TABLE 1

| Node name | Node identifier |
|---|---|
| Blockchain node 10b | AAAAA |
| Blockchain node 10c | BBBBB |
| . . . | . . . |
| Blockchain node 10d | CCCCC |

The node identifier may be an internet protocol (IP) address, and any other information that may be configured for identifying the node in the blockchain network. Table 1 only uses the IP address as an example for description.

Assuming that the node identifier of the blockchain node 10*a* is FFFFFF, the blockchain node 10*a* may send a stream-resource channel creation request to the blockchain node 10*d* through the node identifier CCCCC, and the blockchain node 10*d* may determine, through the node identifier FFFFFF, that the stream-resource channel creation request is sent by the blockchain node 10*a*. Similarly, the blockchain node 10*d* may send, to the blockchain node 10*c* through the node identifier BBBBBB, a block for which consensus is to be reached, and the blockchain node 10*c* may determine, through the node identifier CCCCCC, that the block for which consensus is to be reached is sent by the blockchain node 10*d*. Data transmission between other nodes is similar and is not described one by one.

A connection method of the data connection is not limited, and may be direct or indirect connection through wired communication, may be direct or indirect connection through wireless communication, or may be other connection methods. The present application is not limited herein.

Each blockchain node (for example, the blockchain node 10*a*, the blockchain node 10*b*, the blockchain node 10*c*, and the blockchain node 10*d*) in the blockchain node cluster 10 may be used to maintain the same blockchain network, and this embodiment of the present application does not limit the type of the blockchain network, which may be a private chain, a public chain, or a consortium chain including a private chain and a public chain. Any two blockchain nodes in the blockchain node cluster 10 may form a point-to-point (P2P) network, and the point-to-point network may adopt the P2P protocol. In a distributed system, any device such as a server or a terminal may join to become a blockchain node.

The system may include one or more terminal devices, and this embodiment of the present application does not limit the number of terminal devices in the terminal device cluster 100. As shown in FIG. 1, the terminal device cluster 100 includes a terminal device 100*a*, a terminal device 100*b*, a terminal device 100*c*, and a terminal device 100*d*. There may be a communication connection in the terminal device cluster 100, for example, there may be a communication connection between the terminal device 100*c* and the terminal device 100*a*. Any terminal device in the terminal device cluster 100 may have a communication connection with any blockchain node in the blockchain node cluster 10. For example, there is a communication connection between the blockchain node 10*a* and the terminal device 100*b*. There is a communication connection between the blockchain node 10*d* and the terminal device 100*c*. Any terminal device in the terminal device cluster 100 may have a communication connection with the service server 101. For example, there may be a communication connection between the terminal device 100*a* and the service server 101. A connection method of the communication connection is not limited, and may be direct or indirect connection through wired communication, may be direct or indirect connection through wireless communication, or may be other methods. The present application is not limited herein.

Each terminal device in the terminal device cluster 100 shown in FIG. 1 may be installed with a client. When the client is run in each terminal device, the client may exchange data with the blockchain node cluster 10 shown in FIG. 1, that is, the above communication connection, and may also exchange data with the background server (for example, the service server 101) corresponding to the client. The client may be a video application, a social networking application, an instant messaging application, an office software application, a navigation application, a shopping application, a financial management application, a business application, a browser, and other application clients that have the function of sending request messages. The client may be an independent client or an embedded sub-client integrated in a client (for example, a social networking client, an education client, or a multimedia client), which is not limited herein.

The service server 101 may be a background server corresponding to the client installed on the terminal device in the terminal device cluster 100. The system may include one or more service servers 101, and the number of service servers 101 is not limited herein. Taking a digital asset application as an example, each terminal device may perform, through a client corresponding to the digital asset application, data transmission with a background server corresponding to the digital asset application. For example, the terminal device may upload a stream-resource channel creation request to the background server through the client of the digital asset application, and then the background server may transmit the stream-resource channel creation request to the blockchain network. Another feasible manner is that the terminal device may directly transmit the stream-resource channel creation request to the blockchain network through the client of the digital asset application.

The blockchain nodes in FIG. 1 include but are not limited to mobile terminals or servers. The server may be an independent physical server, or a server cluster composed of multiple physical servers or a distributed system, or may be a cloud server that provides basic cloud computing services such as cloud services, cloud databases, cloud computing, cloud functions, cloud storage, and network services, cloud communications, middleware services, domain name services, security services, content delivery networks (CDN), big data, and artificial intelligence platforms. The mobile terminals include but are not limited to mobile phones, computers, intelligent voice interaction devices, smart home appliances, vehicle-mounted terminals, aircraft, or the like. The mobile terminal and the server may be connected directly or indirectly through wired or wireless methods, which are not limited in the embodiments of the present application.

Figure 2A:
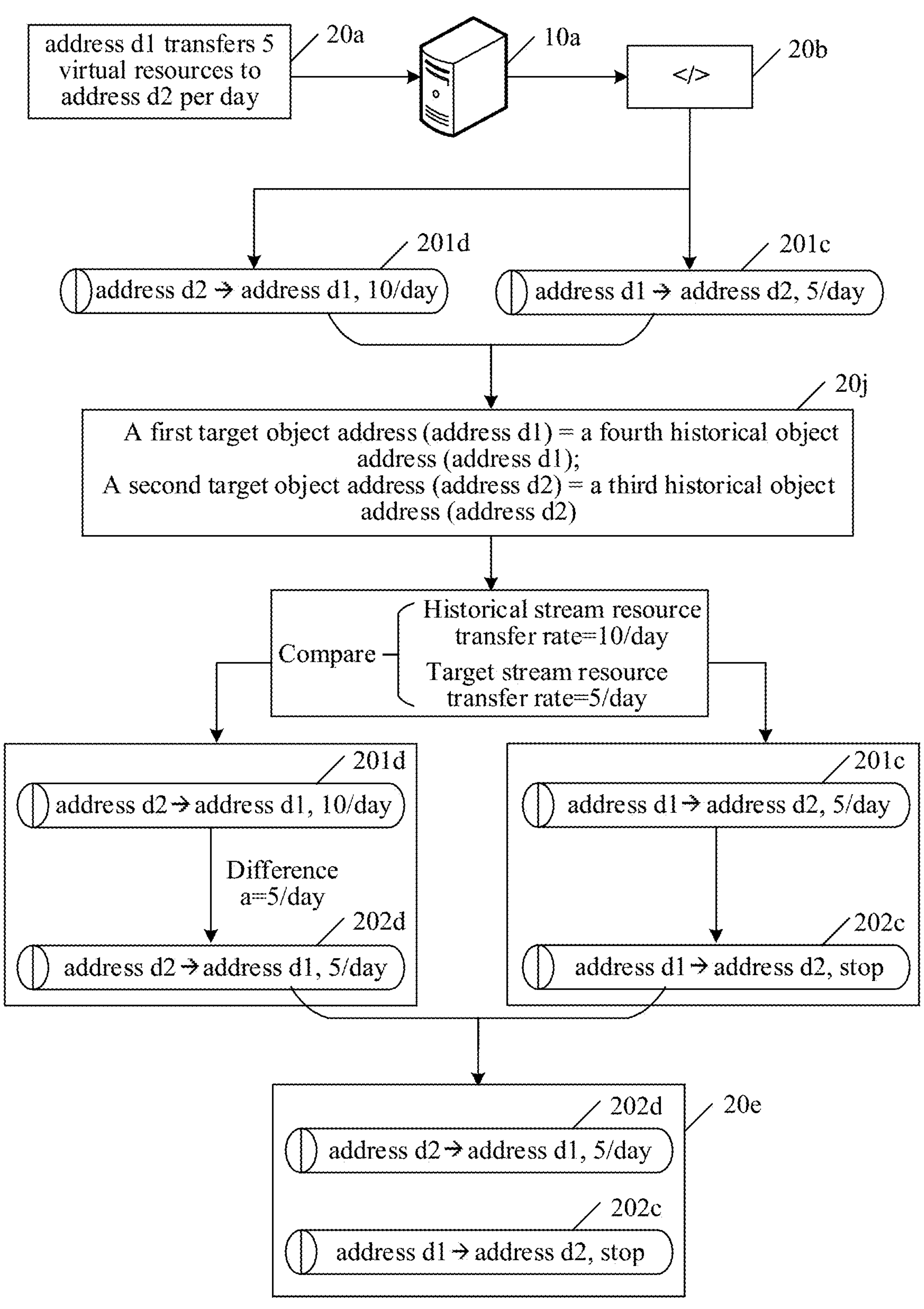
FIG. 2*a* is a first schematic diagram of a data processing scenario based on a blockchain according to an embodiment of the present application.

Further, FIG. 2*a* is a first schematic diagram of a data processing scenario based on a blockchain according to an embodiment of the present application. An implementation process of this data processing scenario may be performed in a blockchain node. The blockchain node may be any blockchain node in the blockchain node cluster 10 in the embodiment corresponding to FIG. 1. FIG. 2*a* takes the blockchain node 10*a* as an example for description. As shown in FIG. 2*a*, the blockchain node 10*a* obtains a stream-resource channel creation request 20*a*. In this embodiment of the present application, the stream-resource channel creation request 20*a* is, for example, "an address d1 transfers 5 virtual resources to an address d2 per day". The first target object address having a stream-resource transfer-out attribute is, for example, the address d1, the second target object address having a stream-resource transfer-in attribute is, for example, the address d2, and the target stream-resource transfer rate is, for example, transferring 5 virtual resources per day.

After obtaining the stream-resource channel creation request 20*a*, the blockchain node 10*a* calls a stream-resource transfer contract 20*b* in the blockchain. The stream-resource transfer contract 20*b* is a smart contract and may implement stream-resource transfer on the chain. Based on the stream-resource transfer contract 20*b*, the blockchain node 10*a* creates a target stream-resource transfer channel 201*c* in the blockchain for the stream-resource channel creation request 20*a*. For simplicity and clarity, FIG. 2*a* shows the stream-resource transfer rate in an abbreviated manner, including: the target stream-resource transfer rate (that is, 5 virtual resources are transferred per day) is abbreviated as 5/day, and the historical stream-resource transfer rate (that is, 10 virtual resources are transferred per day) is abbreviated as 10/day. The symbol "→" in FIG. 2*a* has a directional meaning, for example, the symbol "→" in the target stream-resource transfer channel 201*c* indicates that the address d1 has the stream-resource transfer-out attribute, and the address d2 has the stream-resource transfer-in attribute.

In this embodiment of the present application, the target stream-resource transfer channel 201*c* provides a function of stream-resource transfer based on the stream-resource transfer contract 20*b* for the target object address pair in the stream-resource channel creation request 20*a*, that is, the blockchain node 10*a* may perform stream-resource transfer between target object address pairs based on the stream-resource transfer contract 20*b*. The target object address pair in FIG. 2*a* includes the address d1 and the address d2.

According to the target object address pair, the blockchain node 10*a* may obtain the historical stream-resource transfer channel including the historical object address pair from the blockchain, where object addresses in the target object address pair and object addresses in the historical object address pair share an identical object address. The historical stream-resource transfer channel provides the function of stream-resource transfer based on the stream-resource transfer contract 20*b* for a historical object address pair. That is, based on the stream-resource transfer contract 20*b*, the blockchain node 10*a* may perform stream-resource transfer between the historical object address pairs. The process of obtaining the historical stream-resource transfer channel is not described in detail herein. Refer to the description of operation S102 in the embodiment corresponding to FIG. 3 below.

Refer to FIG. 2*a* again. In this embodiment of the present application, the historical stream-resource transfer channel 201*d* is "address d2→address d1, 10/day". For the specific meaning of the historical stream-resource transfer channel 201*d*, refer to the above description of the meaning of the target stream-resource transfer channel 201*c*. Details are not described again herein. The historical object address pair in FIG. 2*a* includes a third historical object address having a stream-resource transfer-out attribute, and a fourth historical object address having a stream-resource transfer-in attribute, that is, the address d2 and the address d1 in FIG. 2*a*.

The blockchain node 10*a* determines the historical stream-resource transfer rate of the historical stream-resource transfer channel 201*d* (the example in FIG. 2*a* is 10/day), and determines the target stream-resource transfer rate of the target stream-resource transfer channel 201*c* (the example in FIG. 2*a* is 5/day). The blockchain node 10*a* may combine the historical stream-resource transfer channel 201*d* and the target stream-resource transfer channel 201*c* according to the target object address pair, the historical object address pair, the historical stream-resource transfer rate, and the target stream-resource transfer rate, to obtain the update stream-resource transfer channel. Specifically, the blockchain node 10*a* obtains the first target object address having the stream-resource transfer-out attribute and the second target object address having the stream-resource transfer-in attribute in the target object address pair, such as the address d1 and the address d2 as shown in FIG. 2*a*. At the same time, the blockchain node 10*a* obtains a third historical object address having a stream-resource transfer-out attribute, and a fourth historical object address having a stream-resource transfer-in attribute in the historical object address pair, such as the address d2 and the address d1 in FIG. 2*a*.

The blockchain node 10*a* may determine the association between the historical object address pair and the target object address pair. In FIG. 2*a*, the association may be a first association 20*j*. The first association 20*j* may represent that the first target object address is the same as the fourth historical object address, and the second target object address is the same as the third historical object address. In this scenario, the blockchain node 10*a* compares the historical stream-resource transfer rate with the target stream-resource transfer rate. In FIG. 2*a*, the historical stream-resource transfer rate (for example, 10/day) is greater than the target stream-resource transfer rate (for example, 5/day). Therefore, the blockchain node 10*a* may set the transfer state of the target stream-resource transfer channel 201*c* to the stop transfer state, as shown in FIG. 2*a*, and obtain the target stream-resource transfer channel 202*c*. "Stop" in the target stream-resource transfer channel 202*c* indicates the stop transfer state.

At the same time, the blockchain node 10*a* determines the first stream-resource transfer rate difference between the historical stream-resource transfer rate and the target stream-resource transfer rate, for example, identified as a stream-resource transfer rate difference a. In FIG. 2*a*, the stream-resource transfer rate difference a may be equal to 5/day, and is abbreviated as "difference a=5/day". Further, the blockchain node 10*a* updates the historical stream-resource transfer rate of the historical stream-resource transfer channel 201*d* (10/day in FIG. 2*a*) to the stream-resource transfer rate difference a, so that the historical stream-resource transfer channel 202*d* may be obtained.

This embodiment of the present application does not limit the total number of target stream-resource transfer channels, which is determined according to the actual application scenario and may be one or more. FIG. 2*a* takes one target stream-resource transfer channel (that is, the target stream-resource transfer channel 201*a*) as an example for description. If there are multiple target stream-resource transfer channels, processing procedures corresponding to the target stream-resource transfer channels are the same.

This embodiment of the present application does not limit the total number of historical stream-resource transfer channels, which is determined according to the actual application scenario and may be one or more. FIG. 2*a* takes one historical stream-resource transfer channel (that is, a historical stream-resource transfer channel 201*d*) as an example for description. If there are multiple historical stream-resource transfer channels, the processing procedure of the remaining historical stream-resource transfer channel is the same as that of the historical stream-resource transfer channel 201*d* in FIG. 2*a*, that is, an object address in a historical object address pair included in the remaining historical stream-resource transfer channel and the object address in the target object address pair also share an identical object address. Therefore, the object address in the historical object address pair included in the remaining historical stream-resource transfer channel may be combined with the newly generated target stream-resource transfer channel 202*c*. Optionally, the object address in the historical object address pair included in the remaining historical stream-resource transfer channel may also be combined with the newly generated historical stream-resource transfer channel 202*d*. A combination process is the same as the process described above.

Further, the blockchain node 10*a* generates an update stream-resource transfer channel according to the historical stream-resource transfer channel updated to the stream-resource transfer rate difference a and the target stream-resource transfer channel set to the stop transfer state. In FIG. 2*a*, the blockchain node 10*a* may determine the target stream-resource transfer channel 202*c* and the historical stream-resource transfer channel 202*d* as an update stream-resource transfer channel 20*c*.

The embodiment corresponding to FIG. 2*a* is used to describe a scenario in which the association between the historical object address pair and the target object address pair is the first association, and the historical stream-resource transfer rate is greater than the target stream-resource transfer rate. The subsequent processing procedure of the blockchain node when the historical stream-resource transfer rate is less than the target stream-resource transfer rate is the same as that when the historical stream-resource transfer rate is greater than the target stream-resource transfer rate. Specifically, the blockchain node may set the transfer state of the historical stream-resource transfer channel to the stop transfer state; determine a stream-resource transfer rate difference b between the target stream-resource transfer rate and the historical stream-resource transfer rate; update the target stream-resource transfer rate of the target stream-resource transfer channel to the stream-resource transfer rate difference b; and generate an update stream-resource transfer channel according to the target stream-resource transfer channel updated to the stream-resource transfer rate difference b and the historical stream-resource transfer channel set to the stop transfer state.

In addition, there is another scenario in which the historical stream-resource transfer rate is equal to the target stream-resource transfer rate. In this case, the blockchain node sets the transfer state of the historical stream-resource transfer channel to the stop transfer state, and sets the transfer state of the target stream-resource transfer channel to the stop transfer state; and generates an update stream-resource transfer channel according to the target stream-resource transfer channel set to the stop transfer state and the historical stream-resource transfer channel set to the stop transfer state.

Further, the blockchain node performs, according to the update stream-resource transfer channel, stream-resource transfer processing associated with the update object address pair. The process is not described in detail herein. Refer to the description of operation S104 in the embodiment corresponding to FIG. 3 below.

In the embodiment corresponding to FIG. 2*a*, the channel cycle of the stream-resource transfer channel (including the target stream-resource transfer channel and the historical stream-resource transfer channel) is not considered. Therefore, the end timestamp of the stream-resource transfer channel, that is, the expiration timestamp of the stream-resource transfer channel, is not considered. Therefore, FIG. 2*a* may be applied to stream-resource transfer channels not set with a channel cycle and stream-resource transfer channels with the same end timestamp.

Figure 2B:
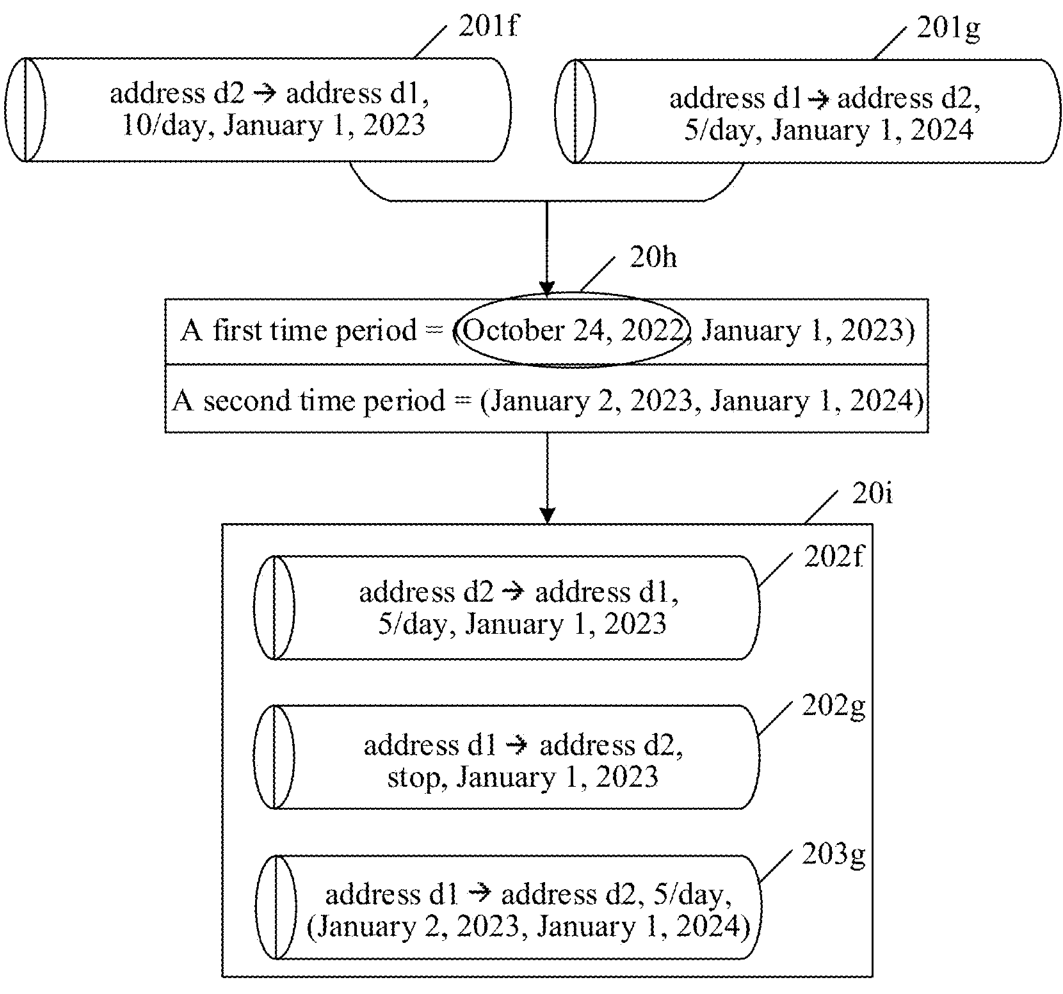
FIG. 2*b* is a second schematic diagram of a data processing scenario based on a blockchain according to an embodiment of the present application.

If the stream-resource transfer channel is set with a channel cycle, and the end timestamps corresponding to the target stream-resource transfer channel and the historical stream-resource transfer channel are different, refer to FIG. 2*b*. FIG. 2*b* is a second schematic diagram of a data processing scenario based on a blockchain according to an embodiment of the present application. In FIG. 2*b*, "address d1→address d2, 5/day, Jan. 1, 2024" is used as an example of the target stream-resource transfer channel 201*g*, and "address d2→address d1, 10/day, Jan. 1, 2023" is used as an example of the historical stream-resource transfer channel 201*f*.

In this embodiment of the present application, when combining the target stream-resource transfer channel and the historical stream-resource transfer channel, the start timestamps respectively corresponding to the target stream-resource transfer channel and the historical stream-resource transfer channel do not need to be considered, as long as the historical stream-resource transfer channel is still in a corresponding channel cycle of the historical stream-resource transfer channel (which may include the start timestamp and the end timestamp), and the target stream-resource transfer channel is still in a corresponding channel cycle of the target stream-resource transfer channel (which may include the start timestamp and the end timestamp). Therefore, none of the target stream-resource transfer channel 201*g* and the historical stream-resource transfer channel 201*f* in FIG. 2*b* is marked with a start timestamp.

The end timestamp of the target stream-resource transfer channel 201*g* may be referred to as a first end timestamp, such as Jan. 1, 2024 in FIG. 2*b*. The end timestamp of the historical stream-resource transfer channel 201*f* may be referred to as a second end timestamp, such as Jan. 1, 2023 in FIG. 2*b*. For corresponding meanings of the target stream-resource transfer channel 201*g* and the historical stream-resource transfer channel 201*f*, refer to the description in FIG. 2*a*. In FIG. 2*b*, the second end timestamp is smaller than the first end timestamp. A valid time period of the combination (which may be equal to the first time period herein) is from a combination timestamp (that is, a combination moment of the stream-resource transfer channel) to the second end timestamp, that is, after the second end timestamp, the combination of the target stream-resource transfer channel 201*g* and the historical stream-resource transfer channel 201*f* becomes invalid.

The blockchain node may determine the first time period (equivalent to a time period in which the combination is valid) and the second time period (equivalent to a time period in which the combination is invalid) according to the first end timestamp (Jan. 1, 2024 in FIG. 2*b*), the second end timestamp (Jan. 1, 2023 in FIG. 2*b*), and a combination timestamp 20*h* (for example, Oct. 24, 2022 in FIG. 2*b*). As shown in FIG. 2*b*, the first time period is (Oct. 24, 2022, Jan. 1, 2023), and the second time period is (Jan. 2, 2023, Jan. 1, 2024). Further, the blockchain node sets the transfer state of the target stream-resource transfer channel 201*g* in the first time period to the stop transfer state, to obtain a target stream-resource transfer channel 202*g*; and sets the transfer state of the target stream-resource transfer channel 201*g* in the second time period to a continuous transfer state, and maintains the target stream-resource transfer rate of the target stream-resource transfer channel 201*g* in the second time period, to obtain a target stream-resource transfer channel 203*g*. Jan. 2, 2023 in the target stream-resource transfer channel 203*g* represents the minimum timestamp of the second time period.

The procedure of processing the historical stream-resource transfer channel 201*f* by the blockchain node is the same as that of processing the historical stream-resource transfer channel 201*f* by the blockchain node in FIG. 2*a*. Therefore, details are not described herein.

Further, the blockchain node may determine, as an update stream-resource transfer channel 20*i*, the historical stream-resource transfer channel updated to the stream-resource transfer rate difference a, the target stream-resource transfer channel that is in the first time period and that is set to the stop transfer state, and the target stream-resource transfer channel that is in the second time period and that maintains the target stream-resource transfer rate, that is, determine the historical stream-resource transfer channel 202*f*, the target stream-resource transfer channel 202*g*, and the target stream-resource transfer channel 203*g* as the update stream-resource transfer channel 20*i*.

The embodiment corresponding to FIG. 2*b* is further detailed description of the embodiment corresponding to FIG. 2*a* from the perspective of the end timestamp of the stream-resource transfer channel, and the above describes a scenario in which the second end timestamp is smaller than the first end timestamp. Another scenario is that the second end timestamp is greater than the first end timestamp. In this case, the blockchain node updates the historical stream-resource transfer rate of the historical stream-resource transfer channel in the third time period to the stream-resource transfer rate difference a. The maximum timestamp of the third time period is the second end timestamp. The third time period has the same meaning as the first time period. At the same time, the blockchain node maintains the historical stream-resource transfer rate of the historical stream-resource transfer channel in the fourth time period. The minimum timestamp of the fourth time period is greater than the second end timestamp, and the fourth time period and the third time period are adjacent time periods. The fourth time period has the same meaning as the second time period. Further, the blockchain node generates the update stream-resource transfer channel according to the historical stream-resource transfer channel that is in the third time period and that is updated to the stream-resource transfer rate difference a, the historical stream-resource transfer channel that is in the fourth time period and that maintains the historical stream-resource transfer rate, and the target stream-resource transfer channel set to the stop transfer state.

Based on FIG. 2*a* and FIG. 2*b*, it can be seen that in the present application, when the association between the target object address pair and the historical object address pair is the first association, the historical stream-resource transfer channel and the target stream-resource transfer channel may be combined, to obtain the update stream-resource transfer channel, which can simplify stream-resource transfer between object address pairs (including the target object address pair and the historical object address pair), and therefore can improve the efficiency of stream-resource transfer.

Figure 3:
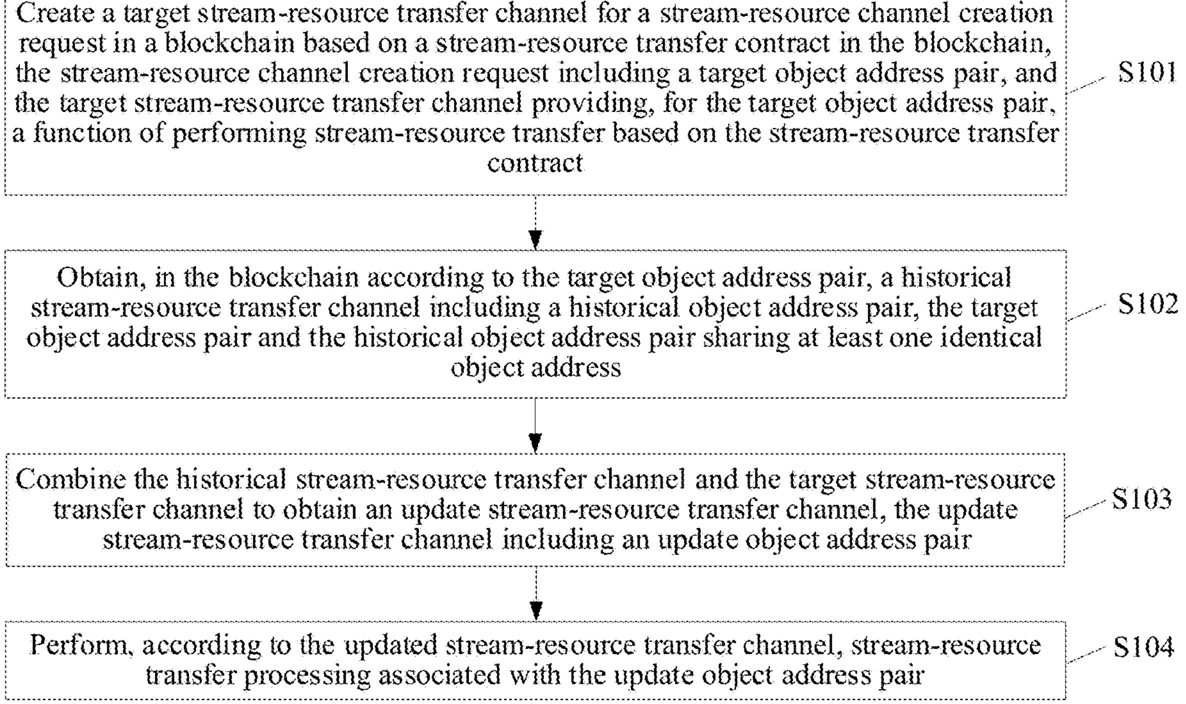
FIG. 3 is a first schematic flowchart of a data processing method based on a blockchain according to an embodiment of the present application.

Further, FIG. 3 is a first schematic flowchart of a data processing method based on a blockchain according to an embodiment of the present application. The data processing method based on a blockchain may be executed by a computer device corresponding to a blockchain node. The blockchain node may be any blockchain node in the blockchain node cluster 10 in the embodiment corresponding to FIG. 1. FIG. 3 takes the blockchain node 10*a* as an example for description. As shown in FIG. 3, the data processing method based on a blockchain may at least include the following operation S101 to operation S104.

Step S101: Create a target stream-resource transfer channel for a stream-resource channel creation request in the blockchain based on a stream-resource transfer contract in the blockchain, the stream-resource channel creation request including a target object address pair, and the target stream-resource transfer channel providing, for the target object address pair, a function of performing stream-resource transfer based on the stream-resource transfer contract.

Specifically, before operation S101, the method further includes: obtaining the stream-resource channel creation request initiated by a first target object address; where the target object address pair includes the first target object address having a stream-resource transfer-out attribute; calling the stream-resource transfer contract in the blockchain according to the stream-resource channel creation request; when the target stream-resource transfer channel is successfully created, determining, based on the stream-resource transfer contract, a to-be-transferred target stream-resource corresponding to the target stream-resource transfer channel; and transferring the to-be-transferred target stream-resource from the first target object address to a contract address of the stream-resource transfer contract.

In the embodiments of the present application, a manner in which the blockchain node obtains the stream-resource channel creation request is not limited, and may be set according to an actual application scenario. The stream-resource channel creation request may be sent to the blockchain node in a point-to-point manner by a terminal device (for example, the terminal device 100*a* in FIG. 1) logged into the first target object address, or may be first sent by the terminal device to a corresponding service server (for example, the service server 101 in FIG. 1) and then forwarded by the service server to the blockchain node.

The stream-resource channel creation request includes a target object address pair, that is, a first target object address having a stream-resource transfer-out attribute, and a second target object address having a stream-resource transfer-in attribute. In the embodiments of the present application, other data included in the stream-resource channel creation request is not limited, and may be set according to an actual application scenario.

For example, the stream-resource channel creation request may include the target stream-resource transfer rate. In this case, the blockchain node may obtain the target stream-resource transfer rate in the stream-resource channel creation request. Alternatively, the request does not include the target stream-resource transfer rate when including the channel cycle (from the start timestamp to the end timestamp), the to-be-transferred target stream-resource, and the transfer type (for example, a fixed amount flow). In this case, the blockchain node may determine the target stream-resource transfer rate based on the channel cycle, the to-be-transferred target stream-resource, and the transfer type.

For example, the stream-resource channel creation request may include the to-be-transferred target stream-resource. In this case, the blockchain node may obtain the to-be-transferred target stream-resource in the stream-resource channel creation request. Alternatively, the request does not include the to-be-transferred target stream-resource when including the channel cycle (from the start timestamp to the end timestamp), the target stream-resource transfer rate, and the transfer type (for example, a fixed amount flow). In this case, the blockchain node may determine the to-be-transferred target stream-resource based on the channel cycle, the target stream-resource transfer rate, and the transfer type.

To transfer stream-resources, the blockchain node transfers the to-be-transferred target stream-resource from the first target object address to a contract address of the stream-resource transfer contract.

Step S102: Obtain, in the blockchain according to the target object address pair, a historical stream-resource transfer channel including a historical object address pair, the target object address pair and the historical object address pair sharing at least one identical object address.

Herein, the historical stream-resource transfer channel provides the function of stream-resource transfer based on the stream-resource transfer contract for a historical object address pair.

Specifically, the target object address pair includes a first target object address having a stream-resource transfer-out attribute, and a second target object address having a stream-resource transfer-in attribute. The historical object address pair includes a first historical object address pair, a second historical object address pair, and a third historical object address pair. A first stream-resource transfer channel including the first historical object address pair is obtained in the blockchain; where the first historical object address pair includes a first historical object address that has the stream-resource transfer-in attribute and that is the same as the first target object address. A second stream-resource transfer channel including the second historical object address pair is obtained in the blockchain; where the second historical object address pair includes a second historical object address that has the stream-resource transfer-out attribute and that is the same as the second target object address. The first historical object address pair is different from the second historical object address pair. A third stream-resource transfer channel including the third historical object address pair is obtained in the blockchain; where the third historical object address pair is the same as the target object address pair. At least one of the first stream-resource transfer channel, the second stream-resource transfer channel, and the third stream-resource transfer channel is determined as the historical stream-resource transfer channel.

The blockchain node traverses created stream-resource transfer channels in the blockchain based on the stream-resource transfer contract, and determines a stream-resource transfer channel that meets the condition among the created stream-resource transfer channels as the historical stream-resource transfer channel. The condition may be divided into three types:

1. A first stream-resource transfer channel includes a first historical object address, where the first historical object address has a stream-resource transfer-in attribute and is the same as the first target object address.

2. A second stream-resource transfer channel includes a second historical object address, where the second historical object address has a stream-resource transfer-out attribute and is the same as the second target object address.

3. A third stream-resource transfer channel includes a third historical object address pair, where the third historical object address pair is the same as the target object address pair.

The historical stream-resource transfer channel 201_d_ and the historical stream-resource transfer channel 201_f_ in FIG. 2_a_ and FIG. 2_b_ may be divided into the first type of condition or the second type of condition.

Step S103: Combine the historical stream-resource transfer channel and the target stream-resource transfer channel to obtain an update stream-resource transfer channel, the update stream-resource transfer channel including an update object address pair.

Specifically, a historical stream-resource transfer rate of the historical stream-resource transfer channel is determined, and a target stream-resource transfer rate of the target stream-resource transfer channel is determined; and the historical stream-resource transfer channel and the target stream-resource transfer channel are combined according to the target object address pair, the historical object address pair, the historical stream-resource transfer rate, and the target stream-resource transfer rate, to obtain the update stream-resource transfer channel.

A specific process of combining the historical stream-resource transfer channel and the target stream-resource transfer channel according to the target object address pair, the historical object address pair, the historical stream-resource transfer rate, and the target stream-resource transfer rate, to obtain the update stream-resource transfer channel may include: obtaining a first target object address having a stream-resource transfer-out attribute, and a second target object address having a stream-resource transfer-in attribute in the target object address pair; obtaining a fifth historical object address having the stream-resource transfer-out attribute and a sixth historical object address having the stream-resource transfer-in attribute in the historical object address pair; setting the transfer state of the target stream-resource transfer channel to the stop transfer state in response to the first target object address being the same as the fifth historical object address, and the second target object address being the same as the sixth historical object address; determining a stream-resource transfer rate sum of the historical stream-resource transfer rate and the target stream-resource transfer rate; updating the historical stream-resource transfer rate of the historical stream-resource transfer channel to the stream-resource transfer rate sum; generating the update stream-resource transfer channel according to the historical stream-resource transfer channel updated to the stream-resource transfer rate sum and the target stream-resource transfer channel set to the stop transfer state. For example, the stream-resource transfer rate sum is identified as a stream-resource transfer rate sum c.

A specific process of updating the historical stream-resource transfer rate of the historical stream-resource transfer channel to the stream-resource transfer rate sum may include: obtaining a first end timestamp of the target stream-resource transfer channel, and obtaining a third end timestamp of the historical stream-resource transfer channel; updating the historical stream-resource transfer rate of the historical stream-resource transfer channel in a fifth time period to the stream-resource transfer rate sum in response to the third end timestamp being less than the first end timestamp; where the maximum timestamp of the fifth time period is the third end timestamp; updating the historical stream-resource transfer rate of the historical stream-resource transfer channel in a sixth time period to the target stream-resource transfer rate; where the maximum timestamp of the sixth time period is the first end timestamp, and the sixth time period and the fifth time period are adjacent time periods; and a specific process of generating the update stream-resource transfer channel according to the historical stream-resource transfer channel updated to the stream-resource transfer rate sum and the target stream-resource transfer channel set to the stop transfer state may include: generating the update stream-resource transfer channel according to the historical stream-resource transfer channel that is in the fifth time period and that is updated to the stream-resource transfer rate sum, the historical stream-resource transfer channel that is in the sixth time period and that is updated to the target stream-resource transfer rate, and the target stream-resource transfer channel set to the stop transfer state.

In response to a transfer rate unit of the historical stream-resource transfer rate being different from a transfer rate unit of the target stream-resource transfer rate, the historical stream-resource transfer rate is adjusted according to the transfer rate unit of the target stream-resource transfer rate, to obtain an adjusted stream-resource transfer rate; where a transfer rate unit of the adjusted stream-resource transfer rate is the same as the transfer rate unit of the target stream-resource transfer rate; and the historical stream-resource transfer channel and the target stream-resource transfer channel are combined according to the target object address pair, the historical object address pair, the adjusted stream-resource transfer rate, and the target stream-resource transfer rate, to obtain the update stream-resource transfer channel.

Figure 4:
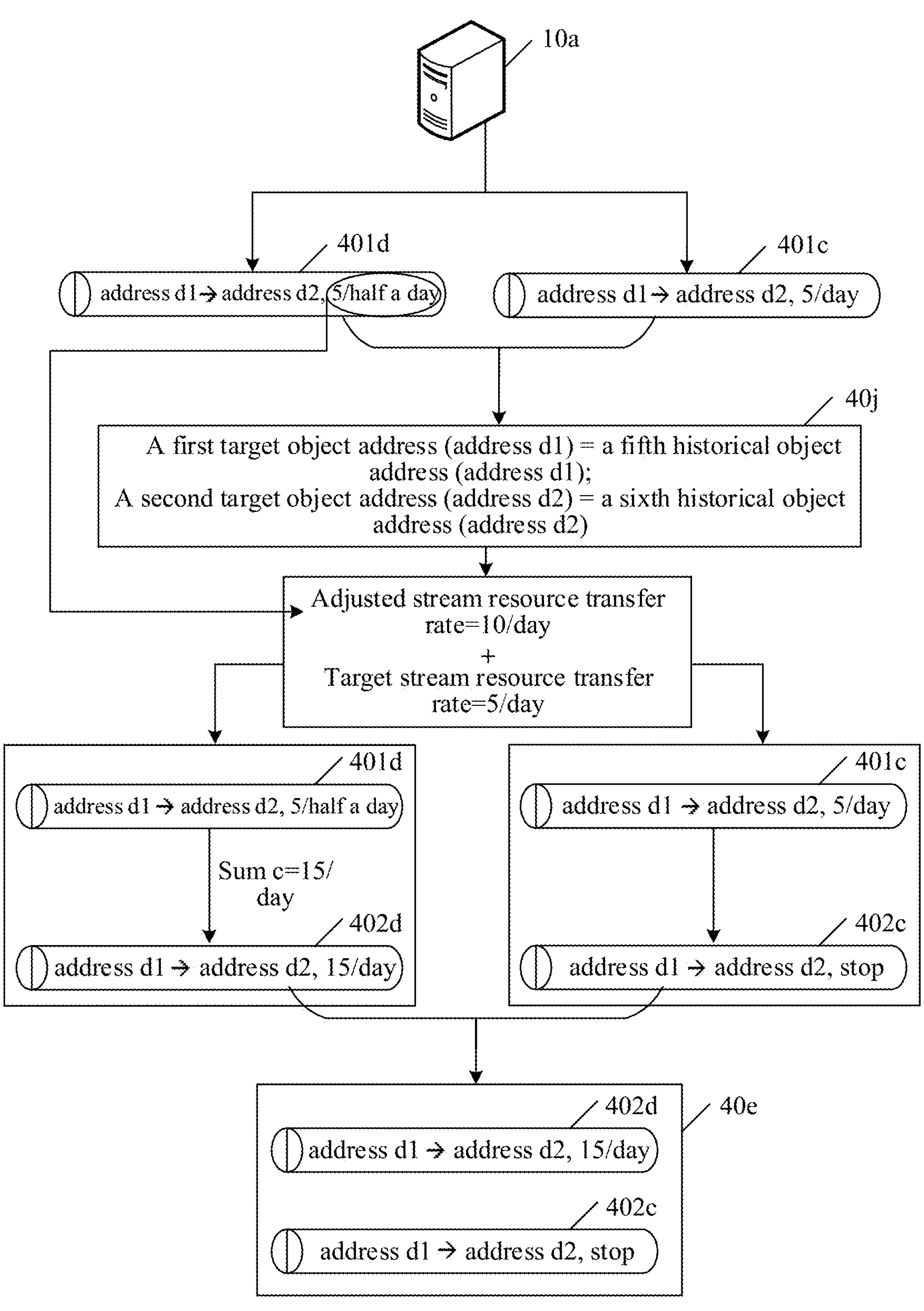
FIG. 4 is a third schematic diagram of a data processing scenario based on a blockchain according to an embodiment of the present application.

FIG. 4 is a third schematic diagram of a data processing scenario based on a blockchain according to an embodiment of the present application. As shown in FIG. 4, the blockchain node 10_a_ determines the historical stream-resource transfer rate of the historical stream-resource transfer channel 401_d_ (the example in FIG. 4 is 5/half a day), and determines the target stream-resource transfer rate of the target stream-resource transfer channel 401_c_ (the example in FIG. 4 is 5/day). For the corresponding meanings of the historical stream-resource transfer channel 401_d_ and the target stream-resource transfer channel 401_c_, refer to the description in the embodiment corresponding to FIG. 2_a_. Details are not described herein again.

The transfer rate unit of the historical stream-resource transfer rate is half a day, and the transfer rate unit of the target stream-resource transfer rate is per day. Therefore, the transfer rate unit of the historical stream-resource transfer rate is different from the transfer rate unit of the target stream-resource transfer rate. In this case, the blockchain node 10_a_ may adjust the historical stream-resource transfer rate according to the transfer rate unit of the target stream-resource transfer rate to obtain the adjusted stream-resource transfer rate (which may be referred to as the first adjusted stream-resource transfer rate for distinguishing). The adjusted stream-resource transfer rate is 10/day in FIG. 4.

Optionally, the blockchain node 10_a_ may adjust the target stream-resource transfer rate according to the transfer rate unit of the historical stream-resource transfer rate to obtain the second adjusted stream-resource transfer rate.

In this embodiment of the present application, the time unit of the transfer rate unit is not limited and may be set according to an actual application scenario, and includes but is not limited to second, minute, hour, day, month, and the like.

Further, the blockchain node 10_a_ may combine the historical stream-resource transfer channel 401_d_ and the target stream-resource transfer channel 401_c_ according to the target object address pair, the historical object address pair, the adjusted stream-resource transfer rate (which is the historical stream-resource transfer rate if the transfer rate unit of the historical stream-resource transfer rate is the same as the transfer rate unit of the target stream-resource transfer rate), and the target stream-resource transfer rate, to obtain an update stream-resource transfer channel. Specifically, the blockchain node 10*a* obtains the first target object address having the stream-resource transfer-out attribute and the second target object address having the stream-resource transfer-in attribute in the target object address pair, such as the address d1 and the address d2 as shown in FIG. 4. At the same time, the blockchain node 10*a* obtains a fifth historical object address having a stream-resource transfer-out attribute, and a sixth historical object address having a stream-resource transfer-in attribute in the historical object address pair, such as the address d1 and the address d2 in FIG. 4.

The blockchain node 10*a* may determine the association between the historical object address pair and the target object address pair, and when combining the historical stream-resource transfer channel and the target stream-resource transfer channel, may determine the update object address pair based on the association. In FIG. 4, the association may be a second association 40*j*. The second association 40*j* may represent that the first target object address is the same as the fifth historical object address, and the second target object address is the same as the sixth historical object address. In this case, the update object address pair is {address d1, address d2}. In this scenario, the blockchain node 10*a* may set the transfer state of the target stream-resource transfer channel 401*c* to the stop transfer state, as shown in FIG. 4, and obtain the target stream-resource transfer channel 402*c*. "Stop" in the target stream-resource transfer channel 402*c* indicates the stop transfer state.

At the same time, the blockchain node 10*a* determines the stream-resource transfer rate sum c of the adjusted stream-resource transfer rate and the target stream-resource transfer rate. In FIG. 4, the stream-resource transfer rate sum c is 15/day and is abbreviated as "sum c=15/day in FIG. 4. Further, the blockchain node 10*a* updates the historical stream-resource transfer rate of the historical stream-resource transfer channel 401*d* (5/half a day in FIG. 4) to the stream-resource transfer rate sum c, so that the historical stream-resource transfer channel 402*d* may be obtained.

Optionally, the blockchain node 10*a* may set the transfer state of the historical stream-resource transfer channel 401*d* to the stop transfer state, and update the historical stream-resource transfer rate (5/day in FIG. 4) of the target stream-resource transfer channel 401*c* to the stream-resource transfer rate sum c.

FIG. 4 takes one target stream-resource transfer channel (that is, the target stream-resource transfer channel 401*c*) and one historical stream-resource transfer channel (that is, the historical stream-resource transfer channel 401*d*) as an example for description. If there are multiple historical stream-resource transfer channels, the processing procedure of the remaining historical stream-resource transfer channel is the same as that of the historical stream-resource transfer channel 401*d* in FIG. 4, that is, an object address in a historical object address pair included in the remaining historical stream-resource transfer channel and the object address in the target object address pair also share an identical object address. Therefore, the object address in the historical object address pair included in the remaining historical stream-resource transfer channel may be combined with the newly generated historical stream-resource transfer channel 402*d*. The association between the historical object address pair included in the remaining historical stream-resource transfer channel and the target object address pair may be the first association 20*j* in FIG. 2*a*, or may be the second association 40*j* described in this operation, or may be the third association in the embodiment corresponding to FIG. 7 below, or may be the fourth association in the embodiment corresponding to FIG. 8 below. That is, historical object address pairs included in different historical stream-resource transfer channels may have different associations with the target object address pair.

Further, the blockchain node 10*a* generates an update stream-resource transfer channel according to the historical stream-resource transfer channel updated to the stream-resource transfer rate sum c and the target stream-resource transfer channel set to the stop transfer state. In FIG. 4, the blockchain node 10*a* may determine the target stream-resource transfer channel 402*c* and the historical stream-resource transfer channel 402*d* as an update stream-resource transfer channel 40*c*.

In the embodiment corresponding to FIG. 4, the channel cycle of the stream-resource transfer channel (including the target stream-resource transfer channel and the historical stream-resource transfer channel) is not considered. Therefore, the end timestamp of the stream-resource transfer channel, that is, the expiration timestamp of the stream-resource transfer channel, is not considered. Therefore, FIG. 4 may be applied to stream-resource transfer channels not set with a channel cycle and stream-resource transfer channels with the same end timestamp.

Figure 5:
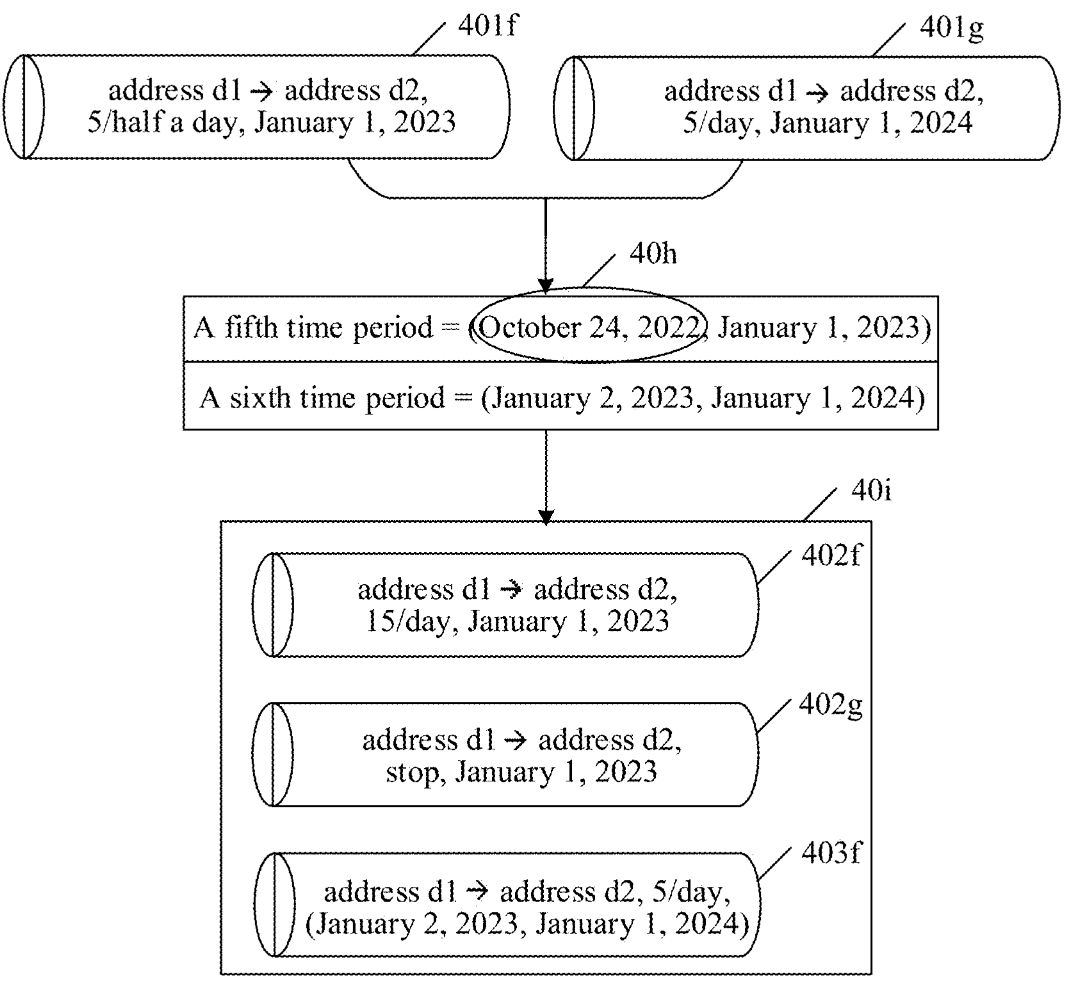
FIG. 5 is a fourth schematic diagram of a data processing scenario based on a blockchain according to an embodiment of the present application.

If the stream-resource transfer channel is set with a channel cycle, and the end timestamps corresponding to the target stream-resource transfer channel and the historical stream-resource transfer channel are different, refer to FIG. 5. FIG. 5 is a fourth schematic diagram of a data processing scenario based on a blockchain according to an embodiment of the present application. In FIG. 5, "address d1→address d2, 5/day, Jan. 1, 2024" is used as an example of the target stream-resource transfer channel 401*g*, and "address d1→address d2, 5/half a day, Jan. 1, 2023" is used as an example of the historical stream-resource transfer channel 201*f*. For the corresponding meanings of the target stream-resource transfer channel 401*g* and the historical stream-resource transfer channel 401*f*, refer to the description of the target stream-resource transfer channel 201*g* and the historical stream-resource transfer channel 201*f* in FIG. 2*b*. Details are not described herein. None of the target stream-resource transfer channel 401*g* and the historical stream-resource transfer channel 401*f* in FIG. 5 is marked with a start timestamp.

The end timestamp of the target stream-resource transfer channel 401*g* may be referred to as a first end timestamp, such as Jan. 1, 2024 in FIG. 5. The end timestamp of the historical stream-resource transfer channel 401*f* may be referred to as a third end timestamp, such as Jan. 1, 2023 in FIG. 5. In FIG. 5, the third end timestamp is smaller than the first end timestamp. A valid time period of the combination (which may be equal to the fifth time period herein) is from a combination timestamp (that is, a combination moment of the stream-resource transfer channel) to the third end timestamp, that is, after the third end timestamp, the combination of the target stream-resource transfer channel 401*g* and the historical stream-resource transfer channel 401*f* becomes invalid.

The blockchain node may determine the fifth time period (equivalent to a time period in which the combination is valid) and the sixth time period (equivalent to a time period in which the combination is invalid) according to the first end timestamp (Jan. 1, 2024 in FIG. 5), the third end timestamp (Jan. 1, 2023 in FIG. 5), and a combination timestamp 40*h* (for example, Oct. 24, 2022 in FIG. 5). As shown in the example of FIG. 5, the fifth time period is (Oct. 24, 2022, Jan. 1, 2023), and the sixth time period is (Jan. 2, 2023, Jan. 1, 2024). Further, the blockchain node updates the historical stream-resource transfer rate of the historical stream-resource transfer channel 401*f* in the fifth time period to the stream-resource transfer rate sum c, so that the historical stream-resource transfer channel 402*f* may be obtained; and updates the historical stream-resource transfer rate of the historical stream-resource transfer channel 401*f* in the sixth time period to the target stream-resource transfer rate, so that the historical stream-resource transfer channel 403*f* may be obtained. Jan. 2, 2023 in the historical stream-resource transfer channel 403*f* represents the minimum timestamp of the sixth time period. Since the time unit in the example is per day, the unit of the timestamp is also per day.

Further, the blockchain node may generate an update stream-resource transfer channel 40*i* according to the historical stream-resource transfer channel that is in the fifth time period and that is updated to the stream-resource transfer rate sum c, the historical stream-resource transfer channel that is in the sixth time period and that is updated to the target stream-resource transfer rate, and the target stream-resource transfer channel set to the stop transfer state, that is, determine the historical stream-resource transfer channel 402*f*, the target stream-resource transfer channel 402*g*, and the historical stream-resource transfer channel 403*f* as the update stream-resource transfer channel 40*i*. Since the historical object address pair and the target object address pair are the same, the processing procedure of the blockchain node when the third end timestamp is greater than the first end timestamp is the same as that when the third end timestamp is less than the first end timestamp. Therefore, details are not described.

Step S104: Perform, according to the update stream-resource transfer channel, stream-resource transfer processing associated with the update object address pair.

Specifically, after the target stream-resource transfer channel is successfully created, the blockchain node transfers, from the first target object address to a contract address based on the stream-resource transfer contract, a to-be-transferred target stream-resource corresponding to the target stream-resource transfer channel. Similarly, the blockchain node transfers, from the historical object address having the stream-resource transfer-out attribute to a contract address based on the stream-resource transfer contract, a to-be-transferred historical stream-resource corresponding to the historical stream-resource transfer channel.

Since the contract address possesses the to-be-transferred target stream-resource and the to-be-transferred historical stream-resource, the blockchain node may continuously transfer virtual resources according to the update stream-resource transfer rate corresponding to the update stream-resource transfer channel, for example, the stream-resource transfer rate sum c (that is, 15/day) in the historical stream-resource transfer channel 402*d* in FIG. 4, and for another example, the stream-resource transfer rate difference a (that is, 5/day) in the historical stream-resource transfer channel 202*d* in FIG. 2*a*. The blockchain node continuously performs transfer processing on virtual resources, but does not transfer the resource in real time to the object address (abbreviated as an update transfer-in object address) having the stream-resource transfer-in attribute in the update object address pair. Instead, when the channel cycle corresponding to the update stream-resource transfer channel ends, or when the update transfer-in object address initiates a stream-resource extraction request, the blockchain node performs settlement processing on the stream-resource, and when the settlement succeeds, transfers a stream-resource settlement result to the update transfer-in object address.

According to the above embodiment, since the update object address pair is obtained based on the combination of the target object address pair and the historical object address pair, stream-resource transfer processing respectively corresponding to the historical stream-resource transfer channel and the target stream-resource transfer channel may be implemented through the update stream-resource transfer channel. Therefore, the present application can reduce the complexity of the stream-resource transfer channel in the blockchain, thereby improving the efficiency of stream-resource transfer.

Figure 6:
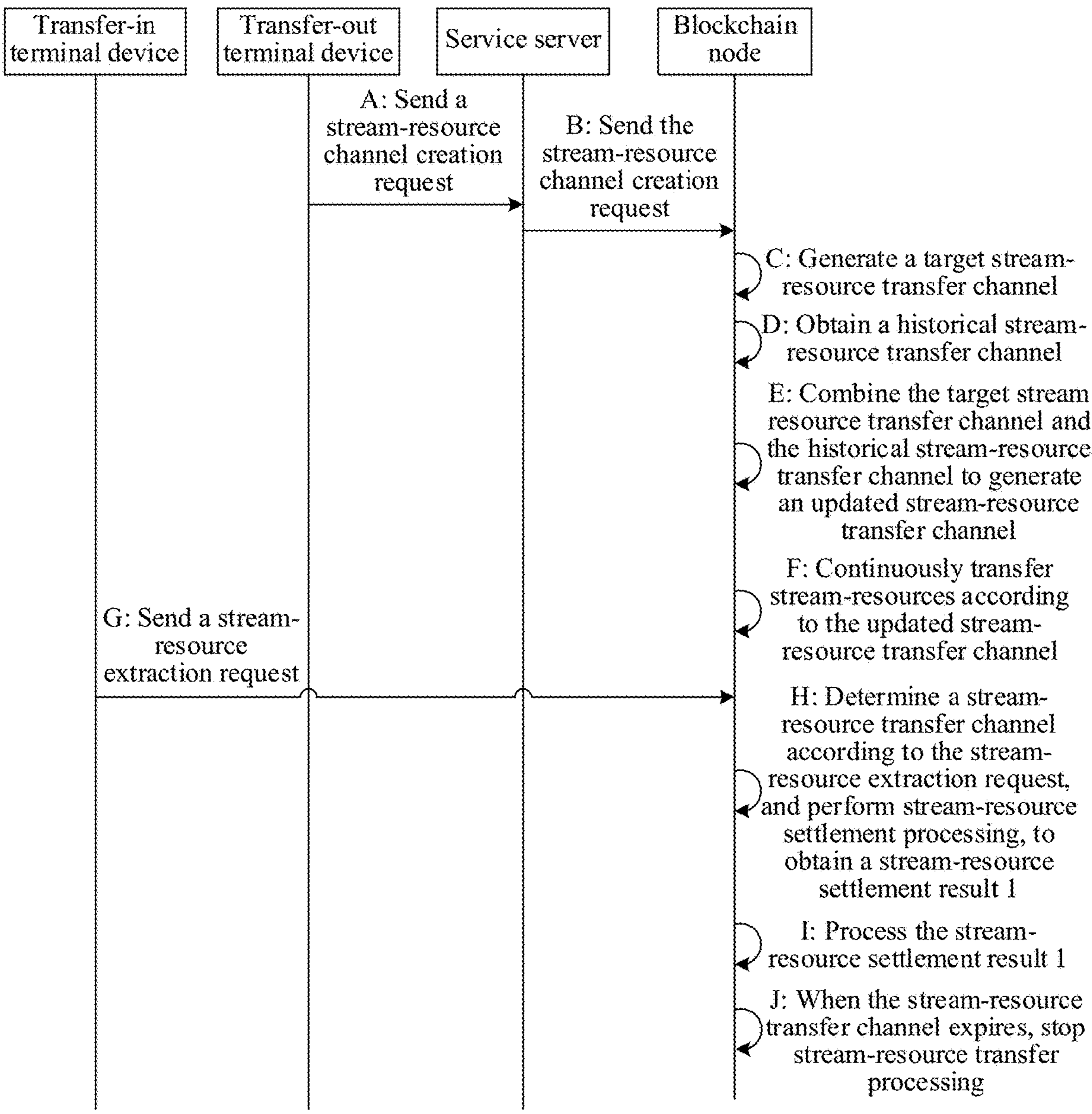
FIG. 6 is a schematic interaction diagram of a data processing method based on a blockchain according to an embodiment of the present application.

FIG. 6 is a schematic interaction diagram of a data processing method based on a blockchain according to an embodiment of the present application. As shown in FIG. 6:

Step A: A transfer-out terminal device sends a stream-resource channel creation request to a service server. The transfer-out terminal device is a terminal device logged into an object address (for example, the first target object address in the example of the present application) having a stream-resource transfer-out attribute, such as the terminal device 100*a* in FIG. 1.

Step B: The service server sends the stream-resource channel creation request to a blockchain node.

The service server is a background server corresponding to a client installed on the transfer-out terminal device. Specifically, on the premise that the first target object address has permission, the service server may sign the stream-resource channel creation request based on a private key of the first target object address, to obtain a first signature message, call the stream-resource transfer contract on the blockchain, create a stream-resource transfer interface, and send the stream-resource channel creation request carrying the first signature message to the blockchain node. Optionally, the transfer-out terminal device can directly send the stream-resource channel creation request to the blockchain node.

Step C: The blockchain node generates a target stream-resource transfer channel.

Step D: The blockchain node obtains a historical stream-resource transfer channel.

Based on the stream-resource transfer contract, the blockchain node can not only create the target stream-resource transfer channel, but also traverse stream-resource transfer channels that have been created in the blockchain, to obtain the historical stream-resource transfer channel.

Step E: The blockchain node combines the target stream-resource transfer channel and the historical stream-resource transfer channel to generate an update stream-resource transfer channel, and determines, based on a target stream-resource transfer rate and a historical stream-resource transfer rate, an update stream-resource transfer rate corresponding to the update stream-resource transfer channel.

Step F: The blockchain node continuously transfers stream-resources according to the update stream-resource transfer channel. As the block height on the chain increases, the update stream-resource transfer channel transfers digital assets on the blockchain.

Step G: A transfer-in terminal device sends a stream-resource extraction request to the blockchain node.

The transfer-in terminal device is a terminal device logged into an object address (for example, the second target object address in the example of the present application) having a stream-resource transfer-in attribute, such as the terminal device 100*b* in FIG. 1. Similarly, the stream-resource extraction request may be forwarded to the blockchain node through the service server.

Step H: The blockchain node determines a stream-resource transfer channel according to the stream-resource extraction request, and performs stream-resource settlement processing, to obtain a stream-resource settlement result 1.

In the example of the present application, the stream-resource settlement method is not limited and may be set according to an actual application scenario, and includes but is not limited to: based on a time (up to an obtaining timestamp of the stream-resource extraction request) for continuous transfer of stream-resources through the stream-resource transfer channel, and based on a block height difference corresponding to the stream-resource transfer channel. The block height difference is a difference between a block height added when the stream-resource transfer channel is generated and a block height added by the stream-resource extraction request.

Step I: The blockchain node performs transfer-in processing on the stream-resource settlement result 1.

Step J: When the stream-resource transfer channel expires, stop stream-resource transfer processing.

Object address pairs corresponding to the stream-resource transfer channel may respectively initiate transaction requests to retrieve their own resources, and finally the stream-resource transfer channel is canceled.

To sum up, since the update object address pair is obtained based on the combination of the target object address pair and the historical object address pair, stream-resource transfer processing respectively corresponding to the historical stream-resource transfer channel and the target stream-resource transfer channel may be implemented through the update stream-resource transfer channel. Therefore, the present application can reduce the complexity of the stream-resource transfer channel in the blockchain, thereby improving the efficiency of stream-resource transfer.

Figure 7:
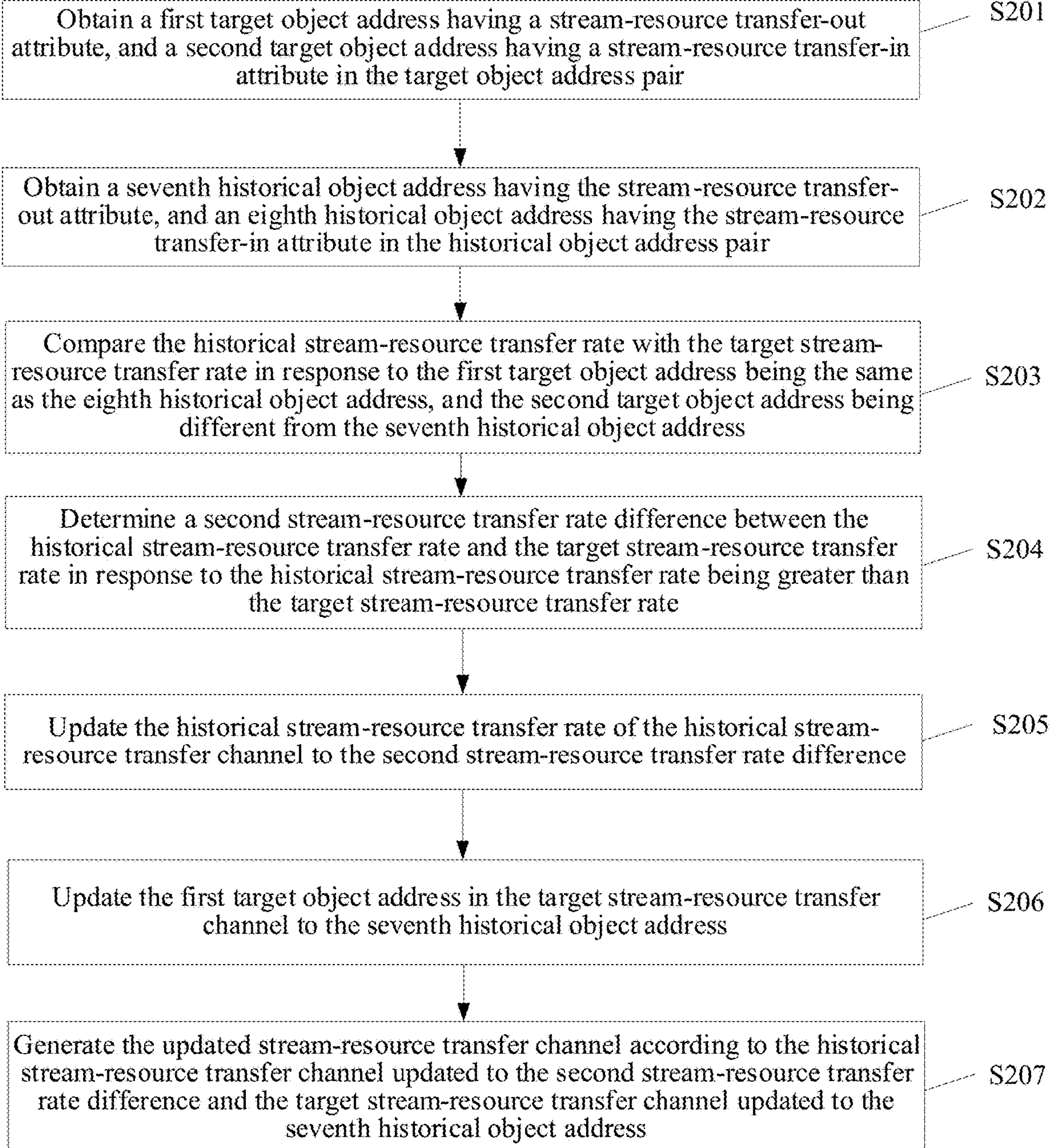
FIG. 7 is a second schematic flowchart of a data processing method based on a blockchain according to an embodiment of the present application.

Further, FIG. 7 is a second schematic flowchart of a data processing method according to an embodiment of the present application. As shown in FIG. 7, the process of the data processing method includes the following operation S201 to operation S207, and operation S201 to operation S207 are a specific embodiment of operation S103 in the embodiment corresponding to FIG. 3.

Step S201: Obtain a first target object address having a stream-resource transfer-out attribute, and a second target object address having a stream-resource transfer-in attribute in the target object address pair.

Step S202: Obtain a seventh historical object address having the stream-resource transfer-out attribute, and an eighth historical object address having the stream-resource transfer-in attribute in the historical object address pair.

For specific implementation process of operation S201 and operation S202, refer to operation S103 in the corresponding embodiment in FIG. 3, and details are not described herein.

Step S203: Compare the historical stream-resource transfer rate with the target stream-resource transfer rate in response to the first target object address being the same as the eighth historical object address, and the second target object address being different from the seventh historical object address.

Specifically, the blockchain node may determine the association between the historical object address pair and the target object address pair. In this embodiment of the present application, the association may be a third association. The third association may represent that the first target object address is the same as the eighth historical object address, and the second target object address is different from the seventh historical object address. In this scenario, the blockchain node compares the historical stream-resource transfer rate with the target stream-resource transfer rate. If the historical stream-resource transfer rate is greater than the target stream-resource transfer rate, operation S204 to operation S207 are executed.

In another scenario, if the historical stream-resource transfer rate is less than the target stream-resource transfer rate, the blockchain node determines a stream-resource transfer rate difference e between the target stream-resource transfer rate and the historical stream-resource transfer rate; updates the target stream-resource transfer rate of the target stream-resource transfer channel to the stream-resource transfer rate difference e; and updates the eighth historical object address in the historical stream-resource transfer channel to the second target object address; generates the update stream-resource transfer channel according to the target stream-resource transfer channel updated to the stream-resource transfer rate difference e and the historical stream-resource transfer channel updated to the second target object address.

In another scenario, if the historical stream-resource transfer rate is equal to the target stream-resource transfer rate, the blockchain node sets the transfer state of the historical stream-resource transfer channel to the stop transfer state; updates the first target object address in the target stream-resource transfer channel to the seventh historical object address; and generates an update stream-resource transfer channel according to the target stream-resource transfer channel updated to the seventh historical object address and the historical stream-resource transfer channel set to the stop transfer state.

Step S204: Determine a second stream-resource transfer rate difference between the historical stream-resource transfer rate and the target stream-resource transfer rate in response to the historical stream-resource transfer rate being greater than the target stream-resource transfer rate.

For example, the second stream-resource transfer rate difference is the stream-resource transfer rate difference d.

Step S205: Update the historical stream-resource transfer rate of the historical stream-resource transfer channel to the second stream-resource transfer rate difference.

Specifically, a first end timestamp of the target stream-resource transfer channel is obtained, and a fourth end timestamp of the historical stream-resource transfer channel is obtained; the historical stream-resource transfer rate of the historical stream-resource transfer channel in a seventh time period is updated to the second stream-resource transfer rate difference in response to the fourth end timestamp being greater than the first end timestamp; where the maximum timestamp of the seventh time period is the first end timestamp, and the historical stream-resource transfer rate of the historical stream-resource transfer channel in the eighth time period is maintained; where the maximum timestamp of the eighth time period is the fourth end timestamp, and the eighth time period and the seventh time period are adjacent time periods.

Step S206: Update the first target object address in the target stream-resource transfer channel to the seventh historical object address.

Specifically, a first end timestamp of the target stream-resource transfer channel is obtained, and a fourth end timestamp of the historical stream-resource transfer channel is obtained; the first target object address in the target stream-resource transfer channel in the ninth time period is updated to the seventh historical object address in response to the fourth end timestamp being less than the first end timestamp; where the maximum timestamp of the ninth time period is the fourth end timestamp. the first target object address of the target stream-resource transfer channel in a tenth time period is maintained; where the maximum timestamp of the tenth time period is the first end timestamp, and the tenth time period and the ninth time period are adjacent time periods.

Step S207: Generate the update stream-resource transfer channel according to the historical stream-resource transfer channel updated to the second stream-resource transfer rate difference and the target stream-resource transfer channel updated to the seventh historical object address.

Specifically, the update stream-resource transfer channel is generated according to the historical stream-resource transfer channel that is in the seventh time period and that is updated to the second stream-resource transfer rate difference, the historical stream-resource transfer channel that is in the eighth time period and that maintains the historical stream-resource transfer rate, and the target stream-resource transfer channel updated to the seventh historical object address.

Specifically, the update stream-resource transfer channel is generated according to the historical stream-resource transfer channel updated to the second stream-resource transfer rate difference, the target stream-resource transfer channel that is in the ninth time period and that is updated to the seventh historical object address, and the target stream-resource transfer channel that is in the tenth time period and that maintains the first target object address.

To sum up, since the update object address pair is obtained based on the combination of the target object address pair and the historical object address pair, stream-resource transfer processing respectively corresponding to the historical stream-resource transfer channel and the target stream-resource transfer channel may be implemented through the update stream-resource transfer channel. Therefore, the present application can reduce the complexity of the stream-resource transfer channel in the blockchain, thereby improving the efficiency of stream-resource transfer.

Figure 8:
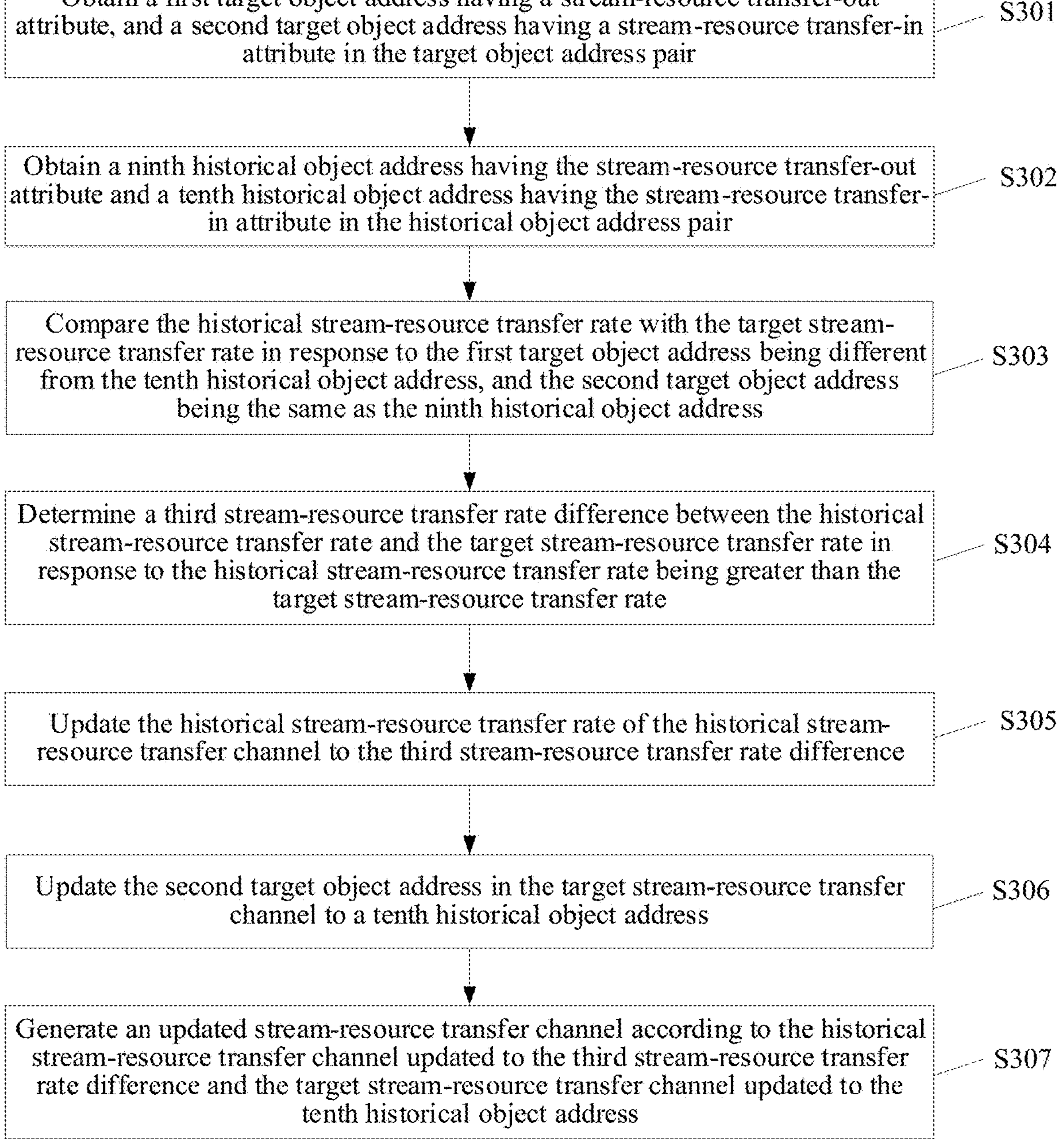
FIG. 8 is a third schematic flowchart of a data processing method based on a blockchain according to an embodiment of the present application.

Further, FIG. 8 is a third schematic flowchart of a data processing method according to an embodiment of the present application. As shown in FIG. 8, the process of the data processing method includes the following operation S301 to operation S307, and operation S301 to operation S307 are a specific embodiment of operation S103 in the embodiment corresponding to FIG. 3.

Step S301: Obtain a first target object address having a stream-resource transfer-out attribute, and a second target object address having a stream-resource transfer-in attribute in the target object address pair.

Step S302: Obtain a ninth historical object address having the stream-resource transfer-out attribute and a tenth historical object address having the stream-resource transfer-in attribute in the historical object address pair.

Step S303: Compare the historical stream-resource transfer rate with the target stream-resource transfer rate in response to the first target object address being different from the tenth historical object address, and the second target object address being the same as the ninth historical object address.

Specifically, The blockchain node may determine the association between the historical object address pair and the target object address pair. In this embodiment of the present application, the association may be a fourth association. The fourth association may represent that the first target object address is different from the tenth historical object address, and the second target object address is the same as the ninth historical object address. In this scenario, the blockchain node compares the historical stream-resource transfer rate with the target stream-resource transfer rate. If the historical stream-resource transfer rate is greater than the target stream-resource transfer rate, operation S304 to operation S307 are executed.

In another scenario, if the historical stream-resource transfer rate is less than the target stream-resource transfer rate, the blockchain node determines a stream-resource transfer rate difference g between the target stream-resource transfer rate and the historical stream-resource transfer rate; updates the target stream-resource transfer rate of the target stream-resource transfer channel to the stream-resource transfer rate difference g; and updates the ninth historical object address in the historical stream-resource transfer channel to the first target object address; and generates the update stream-resource transfer channel according to the target stream-resource transfer channel updated to the stream-resource transfer rate difference g and the historical stream-resource transfer channel updated to the first target object address.

In another scenario, if the historical stream-resource transfer rate is equal to the target stream-resource transfer rate, the blockchain node sets the transfer state of the historical stream-resource transfer channel to the stop transfer state; updates the second target object address in the target stream-resource transfer channel to the tenth historical object address; and generates an update stream-resource transfer channel according to the target stream-resource transfer channel updated to the tenth historical object address and the historical stream-resource transfer channel set to the stop transfer state.

Step S304: Determine a third stream-resource transfer rate difference between the historical stream-resource transfer rate and the target stream-resource transfer rate in response to the historical stream-resource transfer rate being greater than the target stream-resource transfer rate.

For example, the third stream-resource transfer rate difference is a stream-resource transfer rate difference f.

Step S305: Update the historical stream-resource transfer rate of the historical stream-resource transfer channel to the third stream-resource transfer rate difference.

Specifically, a first end timestamp of the target stream-resource transfer channel is obtained, and a fifth end timestamp of the historical stream-resource transfer channel is obtained; the historical stream-resource transfer rate of the historical stream-resource transfer channel in an eleventh time period is updated to the third stream-resource transfer rate difference in response to the fifth end timestamp being greater than the first end timestamp; where the maximum timestamp of the eleventh time period is the first end timestamp, the historical stream-resource transfer rate of the historical stream-resource transfer channel in the twelfth time period is maintained; where the maximum timestamp of the twelfth time period is the fifth end timestamp, and the twelfth time period and the eleventh time period are adjacent time periods.

Step S306: Update the second target object address in the target stream-resource transfer channel to the tenth historical object address.

Specifically, a first end timestamp of the target stream-resource transfer channel is obtained, and a fifth end timestamp of the historical stream-resource transfer channel is obtained; the second target object address in the target stream-resource transfer channel in the thirteenth time period is updated to the tenth historical object address in response to the fifth end timestamp being less than the first end timestamp; where the maximum timestamp of the thirteenth time period is the fifth end timestamp, the second target object address of the target stream-resource transfer channel in a fourteenth time period is maintained; where the maximum timestamp of the fourteenth time period is the first end timestamp, and the fourteenth time period and the thirteenth time period are adjacent time periods.

Step S307: Generate the update stream-resource transfer channel according to the historical stream-resource transfer channel updated to the third stream-resource transfer rate difference and the target stream-resource transfer channel updated to the tenth historical object address.

Specifically, the update stream-resource transfer channel is generated according to the historical stream-resource transfer channel that is in the eleventh time period and that is updated to the third stream-resource transfer rate difference, the historical stream-resource transfer channel that is in the twelfth time period and that maintains the historical stream-resource transfer rate, and the target stream-resource transfer channel updated to the tenth historical object address.

Specifically, the update stream-resource transfer channel is generated according to the historical stream-resource transfer channel updated to the third stream-resource transfer rate difference, the target stream-resource transfer channel that is in the thirteenth time period and that is updated to the tenth historical object address, and the target stream-resource transfer channel that is in the fourteenth time period and that maintains the second target object address.

To sum up, since the update object address pair is obtained based on the combination of the target object address pair and the historical object address pair, stream-resource transfer processing respectively corresponding to the historical stream-resource transfer channel and the target stream-resource transfer channel may be implemented through the update stream-resource transfer channel. Therefore, the present application can reduce the complexity of the stream-resource transfer channel in the blockchain, thereby improving the efficiency of stream-resource transfer.

Figure 9:
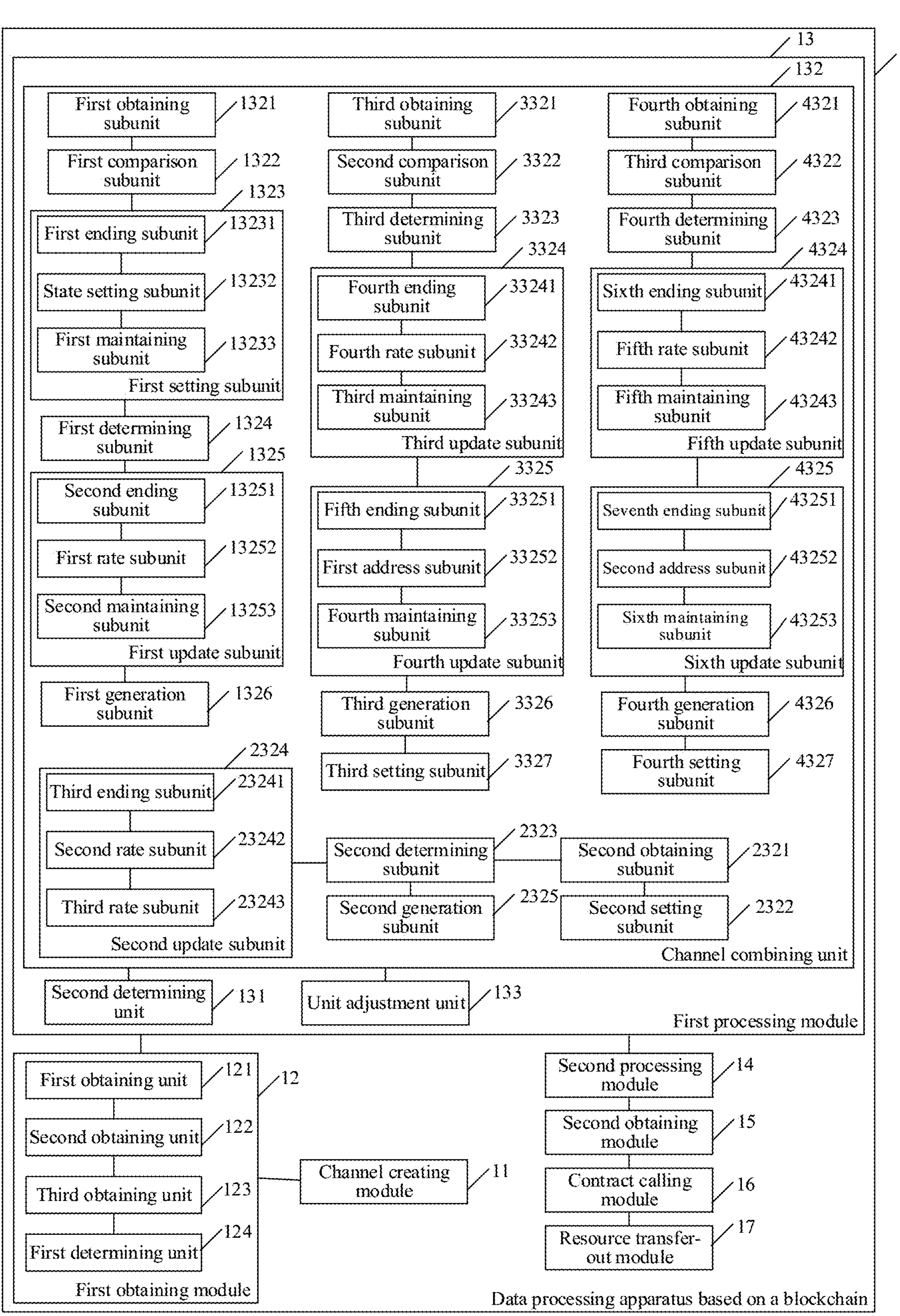
FIG. 9 is a schematic structural diagram of a data processing apparatus based on a blockchain according to an embodiment of the present application.

Further, FIG. 9 is a schematic structural diagram of a data processing apparatus 1 based on a blockchain according to an embodiment of the present application. The data processing apparatus based on a blockchain may run on a master node with consensus permission in a blockchain network. The data processing apparatus 1 based on a blockchain may be configured to execute corresponding operations in the method provided by the embodiments of the present application. As shown in FIG. 9, the data processing apparatus 1 based on a blockchain may include: a channel creation module 11, a first obtaining module 12, a first processing module 13, and a second processing module 14.

The channel creation module 11 is configured to create a target stream-resource transfer channel for a stream-resource channel creation request in the blockchain based on a stream-resource transfer contract in the blockchain, the stream-resource channel creation request including a target object address pair, and the target stream-resource transfer channel providing, for the target object address pair, a function of performing stream-resource transfer based on the stream-resource transfer contract.

The first obtaining module 12 is configured to obtain, in the blockchain according to the target object address pair, a historical stream-resource transfer channel including a historical object address pair, the target object address pair and the historical object address pair sharing at least one identical object address.

The first processing module 13 is configured to combine the historical stream-resource transfer channel and the target stream-resource transfer channel to obtain an update stream-resource transfer channel, the update stream-resource transfer channel including an update object address pair.

The second processing module 14 is configured to perform, according to the update stream-resource transfer channel, stream-resource transfer processing associated with the update object address pair.

For specific implementations of functions of the channel creation module 11, the first obtaining module 12, the first processing module 13, and the second processing module 14, refer to operation S101 to operation S104 of the above corresponding embodiment in FIG. 3. Details are not described herein.

Referring to FIG. 9 again, the data processing apparatus 1 based on a blockchain may further include: a second obtaining module 15, a contract calling module 16, and a resource transfer-out module 17.

The second obtaining module 15 is configured to obtain the stream-resource channel creation request initiated by a first target object address. The target object address pair includes the first target object address having a stream-resource transfer-out attribute.

The contract calling module 16 is configured to call the stream-resource transfer contract in the blockchain according to the stream-resource channel creation request.

The contract calling module 16 is further configured to: when the target stream-resource transfer channel is successfully created, determine, based on the stream-resource transfer contract, a to-be-transferred target stream-resource corresponding to the target stream-resource transfer channel.

The resource transfer-out module 17 is configured to transfer the to-be-transferred target stream-resource from the first target object address to a contract address of the stream-resource transfer contract.

For specific implementations of functions of the second obtaining module 15, the contract calling module 16, and the resource transfer-out module 17, refer to operation S101 of the above corresponding embodiment in FIG. 3. Details are not described herein.

Referring to FIG. 9 again, the target object address pair includes a first target object address having a stream-resource transfer-out attribute, and a second target object address having a stream-resource transfer-in attribute. The historical object address pair includes a first historical object address pair, a second historical object address pair, and a third historical object address pair.

The first obtaining module 12 may include: a first obtaining unit 121, a second obtaining unit 122, a third obtaining unit 123, and a first determining unit 124.

The first obtaining unit 121 is configured to obtain, in the blockchain, a first stream-resource transfer channel including the first historical object address pair; where the first historical object address pair includes a first historical object address that has the stream-resource transfer-in attribute and that is the same as the first target object address.

The second obtaining unit 122 is configured to obtain, in the blockchain, a second stream-resource transfer channel including the second historical object address pair; where the second historical object address pair includes a second historical object address that has the stream-resource transfer-out attribute and that is the same as the second target object address.

The third obtaining unit 123 is configured to obtain, in the blockchain, a third stream-resource transfer channel including the third historical object address pair; where the third historical object address pair is the same as the target object address pair.

The first determining unit 124 is configured to determine at least one of the first stream-resource transfer channel, the second stream-resource transfer channel, and the third stream-resource transfer channel as the historical stream-resource transfer channel.

For specific implementations of functions of the first obtaining unit 121, the second obtaining unit 122, the third obtaining unit 123, and the first determining unit 124, refer to operation S102 of the above corresponding embodiment in FIG. 3. Details are not described herein.

Referring to FIG. 9 again, the first processing module 13 may include: a second determining unit 131 and a channel combining unit 132.

The second determining unit 131 is configured to determine a historical stream-resource transfer rate of the historical stream-resource transfer channel, and determine a target stream-resource transfer rate of the target stream-resource transfer channel.

The channel combining unit 132 is configured to combine the historical stream-resource transfer channel and the target stream-resource transfer channel according to the target object address pair, the historical object address pair, the historical stream-resource transfer rate, and the target stream-resource transfer rate, to obtain the update stream-resource transfer channel.

For specific implementations of functions of the second determining unit 131 and the channel combining unit 132, refer to operation S103 of the above corresponding embodiment in FIG. 3. Details are not described herein.

Referring to FIG. 9 again, the channel combining unit 132 may include: a first obtaining subunit 1321, a first comparison subunit 1322, a first setting subunit 1323, a first determining subunit 1324, a first update subunit 1325, and a first generation subunit 1326.

The first obtaining subunit 1321 is configured to obtain a first target object address having a stream-resource transfer-out attribute, and a second target object address having a stream-resource transfer-in attribute in the target object address pair.

The first obtaining subunit 1321 is further configured to obtain a third historical object address having the stream-resource transfer-out attribute and a fourth historical object address having the stream-resource transfer-in attribute in the historical object address pair.

The first comparison subunit 1322 is configured to compare the historical stream-resource transfer rate with the target stream-resource transfer rate in response to the first target object address being the same as the fourth historical object address, and the second target object address being the same as the third historical object address.

The first setting subunit 1323 is configured to set a transfer state of the target stream-resource transfer channel to a stop transfer state in response to the historical stream-resource transfer rate being greater than the target stream-resource transfer rate.

The first determining subunit 1324 is configured to determine a first stream-resource transfer rate difference between the historical stream-resource transfer rate and the target stream-resource transfer rate.

The first update subunit 1325 is configured to update the historical stream-resource transfer rate of the historical stream-resource transfer channel to the first stream-resource transfer rate difference.

The first generation subunit 1326 is configured to generate the update stream-resource transfer channel according to the historical stream-resource transfer channel updated to the first stream-resource transfer rate difference and the target stream-resource transfer channel set to the stop transfer state.

For specific implementations of functions of the first obtaining subunit 1321, the first comparison subunit 1322, the first setting subunit 1323, the first determining subunit 1324, the first update subunit 1325, and the first generation subunit 1326, refer to the above corresponding embodiment in FIG. 2*a*. Details are not described herein.

Referring to FIG. 9 again, the first setting subunit 1323 may include: a first ending subunit 13231, a state setting subunit 13232, and a first maintaining subunit 13233.

The first ending subunit 13231 is configured to obtain a first end timestamp of the target stream-resource transfer channel, and obtain a second end timestamp of the historical stream-resource transfer channel.

The state setting subunit 13232 is configured to set the transfer state of the target stream-resource transfer channel in a first time period to the stop transfer state in response to the second end timestamp being less than the first end timestamp; where the maximum timestamp of the first time period is the second end timestamp.

The first maintaining subunit 13233 is configured to set the transfer state of the target stream-resource transfer channel in a second time period to a continuous transfer state, and maintain the target stream-resource transfer rate of the target stream-resource transfer channel in the second time period; where the maximum timestamp of the second time period is the first end timestamp, and the second time period and the first time period are adjacent time periods.

The first generation subunit 1326 is specifically configured to generate the update stream-resource transfer channel according to the historical stream-resource transfer channel updated to the first stream-resource transfer rate difference, the target stream-resource transfer channel that is in the first time period and that is set to the stop transfer state, and the target stream-resource transfer channel that is in the second time period and that maintains the target stream-resource transfer rate.

For specific implementations of functions of the first ending subunit 13231, the state setting subunit 13232, the first maintaining subunit 13233, and the first generation subunit 1326, refer to the above corresponding embodiment in FIG. 2*b*. Details are not described herein.

Referring to FIG. 9 again, the first update subunit 1325 may include: a second ending subunit 13251, a first rate subunit 13252, and a second maintaining subunit 13253.

The second ending subunit 13251 is configured to obtain the second end timestamp of the historical stream-resource transfer channel and obtain the first end timestamp of the target stream-resource transfer channel.

The first rate subunit 13252 is configured to update the historical stream-resource transfer rate of the historical stream-resource transfer channel in a third time period to the first stream-resource transfer rate difference in response to the second end timestamp being greater than the first end timestamp; where the maximum timestamp of the third time period is the second end timestamp.

The second maintaining subunit 13253 is configured to maintain the historical stream-resource transfer rate of the historical stream-resource transfer channel in the fourth time period; where the minimum timestamp of the fourth time period is greater than the second end timestamp, and the fourth time period and the third time period are adjacent time periods.

The first generation subunit 1326 is specifically configured to generate the update stream-resource transfer channel according to the historical stream-resource transfer channel that is in the third time period and that is updated to the first stream-resource transfer rate difference, the historical stream-resource transfer channel that is in the fourth time period and that maintains the historical stream-resource transfer rate, and the target stream-resource transfer channel set to the stop transfer state.

For specific implementations of functions of the second ending subunit 13251, the first rate subunit 13252, the second maintaining subunit 13253, and the first generation subunit 1326, refer to the above corresponding embodiment in FIG. 2*b*. Details are not described herein.

Referring to FIG. 9 again, the first setting subunit 1323 is further configured to set a transfer state of the historical stream-resource transfer channel to a stop transfer state in response to the historical stream-resource transfer rate being less than the target stream-resource transfer rate.

The first determining subunit 1324 is further configured to determine a stream-resource transfer rate difference b between the target stream-resource transfer rate and the historical stream-resource transfer rate.

The first update subunit 1325 is further configured to update the target stream-resource transfer rate of the target stream-resource transfer channel to the stream-resource transfer rate difference b.

The first generation subunit 1326 is further configured to generate an update stream-resource transfer channel according to the target stream-resource transfer channel updated to the stream-resource transfer rate difference b and the historical stream-resource transfer channel set to the stop transfer state.

For specific implementations of functions of the first setting subunit 1323, the first determining subunit 1324, the first update subunit 1325, and the first generation subunit 1326, refer to the above corresponding embodiment in FIG. 2*a*. Details are not described herein.

Referring to FIG. 9 again, the first setting subunit 1323 is further configured to set a transfer state of the historical stream-resource transfer channel to a stop transfer state, and set a transfer state of the target stream-resource transfer channel to a stop transfer state in response to the historical stream-resource transfer rate being equal to the target stream-resource transfer rate.

The first generation subunit 1326 is further configured to generate an update stream-resource transfer channel according to the target stream-resource transfer channel set to the stop transfer state and the historical stream-resource transfer channel set to the stop transfer state.

For specific implementations of functions of the first setting subunit 1323 and the first generation subunit 1326, refer to the above corresponding embodiment in FIG. 2*a*. Details are not described herein.

Referring to FIG. 9 again, the channel combining unit 132 may include: a second obtaining subunit 2321, a second setting subunit 2322, a second determining subunit 2323, a second update subunit 2324, and a second generation subunit 2325.

The second obtaining subunit 2321 is configured to obtain a first target object address having a stream-resource transfer-out attribute, and a second target object address having a stream-resource transfer-in attribute in the target object address pair.

The second obtaining subunit 2321 is further configured to obtain a fifth historical object address having the stream-resource transfer-out attribute and a sixth historical object address having the stream-resource transfer-in attribute in the historical object address pair.

The second setting subunit 2322 is configured to set the transfer state of the target stream-resource transfer channel to the stop transfer state in response to the first target object address being the same as the fifth historical object address, and the second target object address being the same as the sixth historical object address.

The second determining subunit 2323 is configured to determine a stream-resource transfer rate sum of the historical stream-resource transfer rate and the target stream-resource transfer rate.

The second update subunit 2324 is configured to update the historical stream-resource transfer rate of the historical stream-resource transfer channel to the stream-resource transfer rate sum.

The second generation subunit 2325 is configured to generate the update stream-resource transfer channel according to the historical stream-resource transfer channel updated to the stream-resource transfer rate sum and the target stream-resource transfer channel set to the stop transfer state.

For specific implementations of functions of the second obtaining subunit 2321, the second setting subunit 2322, the second determining subunit 2323, the second update subunit 2324, and the second generation subunit 2325, refer to operation S103 in the above corresponding embodiment in FIG. 3. Details are not described herein.

Referring to FIG. 9 again, the second update subunit 2324 may include: a third ending subunit 23241, a second rate subunit 23242, and a third rate subunit 23243.

The third ending subunit 23241 is configured to obtain a first end timestamp of the target stream-resource transfer channel, and obtain a third end timestamp of the historical stream-resource transfer channel.

The second rate subunit 23242 is configured to update the historical stream-resource transfer rate of the historical stream-resource transfer channel in a fifth time period to the stream-resource transfer rate sum in response to the third end timestamp being less than the first end timestamp; where the maximum timestamp of the fifth time period is the third end timestamp.

The third rate subunit 23243 is configured to update the historical stream-resource transfer rate of the historical stream-resource transfer channel in a sixth time period to the target stream-resource transfer rate; where the maximum timestamp of the sixth time period is the first end timestamp, and the sixth time period and the fifth time period are adjacent time periods.

The second generation subunit 2325 is specifically configured to generate the update stream-resource transfer channel according to the historical stream-resource transfer channel that is in the fifth time period and that is updated to the stream-resource transfer rate sum, the historical stream-resource transfer channel that is in the sixth time period and that is updated to the target stream-resource transfer rate, and the target stream-resource transfer channel set to the stop transfer state.

For specific implementations of functions of the third ending subunit 23241, the second rate subunit 23242, the third rate subunit 23243, and the second generation subunit

2325, refer to operation S103 in the above corresponding embodiment in FIG. 3. Details are not described herein.

Referring to FIG. 9 again, the channel combining unit 132 may include: a third obtaining subunit 3321, a second comparison subunit 3322, a third determining subunit 3323, a third update subunit 3324, a fourth update subunit 3325, and a third generation subunit 3326.

The third obtaining subunit 3321 is configured to obtain a first target object address having a stream-resource transfer-out attribute, and a second target object address having a stream-resource transfer-in attribute in the target object address pair.

The third obtaining subunit 3321 is further configured to obtain a seventh historical object address having the stream-resource transfer-out attribute, and an eighth historical object address having the stream-resource transfer-in attribute in the historical object address pair.

The second comparison subunit 3322 is configured to compare the historical stream-resource transfer rate with the target stream-resource transfer rate in response to the first target object address being the same as the eighth historical object address, and the second target object address being different from the seventh historical object address.

The third determining subunit 3323 is configured to determine a second stream-resource transfer rate difference between the historical stream-resource transfer rate and the target stream-resource transfer rate in response to the historical stream-resource transfer rate being greater than the target stream-resource transfer rate.

The third update subunit 3324 is configured to update the historical stream-resource transfer rate of the historical stream-resource transfer channel to the second stream-resource transfer rate difference.

The fourth update subunit 3325 is configured to update the first target object address in the target stream-resource transfer channel to the seventh historical object address.

The third generation subunit 3326 is configured to generate the update stream-resource transfer channel according to the historical stream-resource transfer channel updated to the second stream-resource transfer rate difference and the target stream-resource transfer channel updated to the seventh historical object address.

For specific implementations of functions of the third obtaining subunit 3321, the second comparison subunit 3322, the third determining subunit 3323, the third update subunit 3324, the fourth update subunit 3325, and the third generation subunit 3326, refer to operation S201 to operation S207 in the above corresponding embodiment in FIG. 7. Details are not described herein.

Referring to FIG. 9 again, the third update subunit 3324 may include: a fourth ending subunit 33241, a fourth rate subunit 33242, and a third maintaining subunit 33243.

The fourth ending subunit 33241 is configured to obtain a first end timestamp of the target stream-resource transfer channel, and obtain a fourth end timestamp of the historical stream-resource transfer channel.

The fourth rate subunit 33242 is configured to update the historical stream-resource transfer rate of the historical stream-resource transfer channel in a seventh time period to the second stream-resource transfer rate difference in response to the fourth end timestamp being greater than the first end timestamp; where the maximum timestamp of the seventh time period is the first end timestamp.

The third maintaining subunit 33243 is configured to maintain the historical stream-resource transfer rate of the historical stream-resource transfer channel in the eighth time period; where the maximum timestamp of the eighth time period is the fourth end timestamp, and the eighth time period and the seventh time period are adjacent time periods.

The third generation subunit 3326 is specifically configured to generate the update stream-resource transfer channel according to the historical stream-resource transfer channel that is in the seventh time period and that is updated to the second stream-resource transfer rate difference, the historical stream-resource transfer channel that is in the eighth time period and that maintains the historical stream-resource transfer rate, and the target stream-resource transfer channel updated to the seventh historical object address.

For specific implementations of functions of the fourth ending subunit 33241, the fourth rate subunit 33242, the third maintaining subunit 33243, and the third generation subunit 3326, refer to operation S205 in the above corresponding embodiment in FIG. 7. Details are not described herein.

Referring to FIG. 9 again, the fourth update subunit 3325 may include: a fifth ending subunit 33251, a first address subunit 33252, and a fourth maintaining subunit 33253.

The fifth ending subunit 33251 is configured to obtain a first end timestamp of the target stream-resource transfer channel, and obtain a fourth end timestamp of the historical stream-resource transfer channel.

The first address subunit 33252 is configured to update the first target object address in the target stream-resource transfer channel in the ninth time period to the seventh historical object address in response to the fourth end timestamp being less than the first end timestamp; where the maximum timestamp of the ninth time period is the fourth end timestamp.

The fourth maintaining subunit 33253 is configured to maintain the first target object address of the target stream-resource transfer channel in a tenth time period; where the maximum timestamp of the tenth time period is the first end timestamp, and the tenth time period and the ninth time period are adjacent time periods.

The third generation subunit 3326 is configured to generate the update stream-resource transfer channel according to the historical stream-resource transfer channel updated to the second stream-resource transfer rate difference, the target stream-resource transfer channel that is in the ninth time period and that is updated to the seventh historical object address, and the target stream-resource transfer channel that is in the tenth time period and that maintains the first target object address.

For specific implementations of functions of the fifth ending subunit 33251, the first address subunit 33252, the fourth maintaining subunit 33253, and the third generation subunit 3326, refer to operation S206 in the above corresponding embodiment in FIG. 7. Details are not described herein.

Referring to FIG. 9 again, the third determining subunit 3323 is further configured to determine a stream-resource transfer rate difference e between the target stream-resource transfer rate and the historical stream-resource transfer rate in response to the historical stream-resource transfer rate being less than the target stream-resource transfer rate.

The third update subunit 3324 is further configured to update the target stream-resource transfer rate of the target stream-resource transfer channel to the stream-resource transfer rate difference e.

The fourth update subunit 3325 is further configured to update the eighth historical object address in the historical stream-resource transfer channel to the second target object address.

The third generation subunit 3326 is further configured to generate the update stream-resource transfer channel according to the target stream-resource transfer channel updated to the stream-resource transfer rate difference e and the historical stream-resource transfer channel updated to the second target object address.

For specific implementations of functions of the third determining subunit 3323, the third update subunit 3324, the fourth update subunit 3325, and the third generation subunit 3326, refer to operation S203 in the above corresponding embodiment in FIG. 7. Details are not described herein.

Referring to FIG. 9 again, the channel combining unit 132 may further include: a third setting subunit 3327.

The third setting subunit 3327 is configured to set a transfer state of the historical stream-resource transfer channel to a stop transfer state in response to the historical stream-resource transfer rate being equal to the target stream-resource transfer rate.

The fourth update subunit 3325 is further configured to update the first target object address in the target stream-resource transfer channel to the seventh historical object address.

The third generation subunit 3326 is further configured to generate an update stream-resource transfer channel according to the target stream-resource transfer channel updated to the seventh historical object address and the historical stream-resource transfer channel set to the stop transfer state.

For specific implementations of functions of the third setting subunit 3327, the fourth update subunit 3325, and the third generation subunit 3326, refer to operation S203 in the above corresponding embodiment in FIG. 7. Details are not described herein.

Referring to FIG. 9 again, the channel combining unit 132 may include: a fourth obtaining subunit 4321, a third comparison subunit 4322, a fourth determining subunit 4323, a fifth update subunit 4324, a sixth update subunit 4325, and a fourth generation subunit 4326.

The fourth obtaining subunit 4321 is configured to obtain a first target object address having a stream-resource transfer-out attribute, and a second target object address having a stream-resource transfer-in attribute in the target object address pair.

The fourth obtaining subunit 4321 is further configured to obtain a ninth historical object address having the stream-resource transfer-out attribute and a tenth historical object address having the stream-resource transfer-in attribute in the historical object address pair.

The third comparison subunit 4322 is configured to compare the historical stream-resource transfer rate with the target stream-resource transfer rate in response to the first target object address being different from the tenth historical object address, and the second target object address being the same as the ninth historical object address.

The fourth determining subunit 4323 is configured to determine a third stream-resource transfer rate difference between the historical stream-resource transfer rate and the target stream-resource transfer rate in response to the historical stream-resource transfer rate being greater than the target stream-resource transfer rate.

The fifth update subunit 4324 is configured to update the historical stream-resource transfer rate of the historical stream-resource transfer channel to the third stream-resource transfer rate difference.

The sixth update subunit 4325 is configured to update the second target object address in the target stream-resource transfer channel to the tenth historical object address.

The fourth generation subunit 4326 is configured to generate the update stream-resource transfer channel according to the historical stream-resource transfer channel updated to the third stream-resource transfer rate difference and the target stream-resource transfer channel updated to the tenth historical object address.

For specific implementations of functions of the fourth obtaining subunit 4321, the third comparison subunit 4322, the fourth determining subunit 4323, the fifth update subunit 4324, the sixth update subunit 4325, and the fourth generation subunit 4326, refer to operation S301 to operation S307 in the above corresponding embodiment in FIG. 8. Details are not described herein.

Referring to FIG. 9 again, the fifth update subunit 4324 may include: a sixth ending subunit 43241, a fifth rate subunit 43242, and a fifth maintaining subunit 43243.

The sixth ending subunit 43241 is configured to obtain a first end timestamp of the target stream-resource transfer channel, and obtain a fifth end timestamp of the historical stream-resource transfer channel.

The fifth rate subunit 43242 is configured to update the historical stream-resource transfer rate of the historical stream-resource transfer channel in an eleventh time period to the third stream-resource transfer rate difference in response to the fifth end timestamp being greater than the first end timestamp; where the maximum timestamp of the eleventh time period is the first end timestamp.

The fifth maintaining subunit 43243 is configured to maintain the historical stream-resource transfer rate of the historical stream-resource transfer channel in the twelfth time period; where the maximum timestamp of the twelfth time period is the fifth end timestamp, and the twelfth time period and the eleventh time period are adjacent time periods.

The fourth generation subunit 4326 is specifically configured to generate the update stream-resource transfer channel according to the historical stream-resource transfer channel that is in the eleventh time period and that is updated to the third stream-resource transfer rate difference, the historical stream-resource transfer channel that is in the twelfth time period and that maintains the historical stream-resource transfer rate, and the target stream-resource transfer channel updated to the tenth historical object address.

For specific implementations of functions of the sixth ending subunit 43241, the fifth rate subunit 43242, the fifth maintaining subunit 43243, and the fourth generation subunit 4326, refer to operation S305 in the above corresponding embodiment in FIG. 8. Details are not described herein.

Referring to FIG. 9 again, the sixth update subunit 4325 may include: a seventh ending subunit 43251, a second address subunit 43252, and a sixth maintaining subunit 43253.

The seventh ending subunit 43251 is configured to obtain a first end timestamp of the target stream-resource transfer channel, and obtain a fifth end timestamp of the historical stream-resource transfer channel.

The second address subunit 43252 is configured to update the second target object address in the target stream-resource transfer channel in the thirteenth time period to the tenth historical object address in response to the fifth end timestamp being less than the first end timestamp; where the maximum timestamp of the thirteenth time period is the fifth end timestamp.

The sixth maintaining subunit 43253 is configured to maintain the second target object address of the target stream-resource transfer channel in a fourteenth time period; where the maximum timestamp of the fourteenth time period is the first end timestamp, and the fourteenth time period and the thirteenth time period are adjacent time periods.

The fourth generation subunit 4326 is specifically configured to generate the update stream-resource transfer channel according to the historical stream-resource transfer channel updated to the third stream-resource transfer rate difference, the target stream-resource transfer channel that is in the thirteenth time period and that is updated to the tenth historical object address, and the target stream-resource transfer channel that is in the fourteenth time period and that maintains the second target object address.

For specific implementations of functions of the seventh ending subunit 43251, the second address subunit 43252, the sixth maintaining subunit 43253, and the fourth generation subunit 4326, refer to operation S306 in the above corresponding embodiment in FIG. 8. Details are not described herein.

Referring to FIG. 9 again, the fourth determining subunit 4323 is further configured to determine a stream-resource transfer rate difference g between the target stream-resource transfer rate and the historical stream-resource transfer rate in response to the historical stream-resource transfer rate being less than the target stream-resource transfer rate.

The fifth update subunit 4324 is further configured to update the target stream-resource transfer rate of the target stream-resource transfer channel to the stream-resource transfer rate difference g.

The sixth update subunit 4325 is further configured to update the ninth historical object address in the historical stream-resource transfer channel to the first target object address.

The fourth generation subunit 4326 is further configured to generate the update stream-resource transfer channel according to the target stream-resource transfer channel updated to the stream-resource transfer rate difference g and the historical stream-resource transfer channel updated to the first target object address.

For specific implementations of functions of the fourth determining subunit 4323, the fifth update subunit 4324, the sixth update subunit 4325, and the fourth generation subunit 4326, refer to operation S303 in the above corresponding embodiment in FIG. 8. Details are not described herein.

Referring to FIG. 9 again, the channel combining unit 132 may further include: a fourth setting subunit 4327.

The fourth setting subunit 4327 is configured to set a transfer state of the historical stream-resource transfer channel to a stop transfer state in response to the historical stream-resource transfer rate being equal to the target stream-resource transfer rate.

The sixth update subunit 4325 is further configured to update the second target object address in the target stream-resource transfer channel to the tenth historical object address.

The fourth generation subunit 4326 is further configured to generate an update stream-resource transfer channel according to the target stream-resource transfer channel updated to the tenth historical object address and the historical stream-resource transfer channel set to the stop transfer state.

For specific implementations of functions of the fourth setting subunit 4327, the sixth update subunit 4325, and the fourth generation subunit 4326, references can be made to operation S303 in the above corresponding embodiment in FIG. 8. Details are not repeated herein.

Referring back to FIG. 9, the first processing module 13 may further include: a unit adjustment submodule 133.

The unit adjustment submodule 133 is configured to: in response to a transfer rate unit of the historical stream-resource transfer rate being different from a transfer rate unit of the target stream-resource transfer rate, adjust the historical stream-resource transfer rate according to the transfer rate unit of the target stream-resource transfer rate, to obtain an adjusted stream-resource transfer rate; where a transfer rate unit of the adjusted stream-resource transfer rate is the same as the transfer rate unit of the target stream-resource transfer rate; and the channel combining unit 132 is specifically configured to combine the historical stream-resource transfer channel and the target stream-resource transfer channel according to the target object address pair, the historical object address pair, the adjusted stream-resource transfer rate, and the target stream-resource transfer rate, to obtain the update stream-resource transfer channel.

For specific implementations of functions of the unit adjustment submodule 133 and the channel combining unit 132, refer to operation S103 of the above corresponding embodiment in FIG. 3. Details are not described herein.

To sum up, since the update object address pair is obtained based on the combination of the target object address pair and the historical object address pair, stream-resource transfer processing respectively corresponding to the historical stream-resource transfer channel and the target stream-resource transfer channel may be implemented through the update stream-resource transfer channel. Therefore, the present application can reduce the complexity of the stream-resource transfer channel in the blockchain, thereby improving the efficiency of stream-resource transfer.

Figure 10:
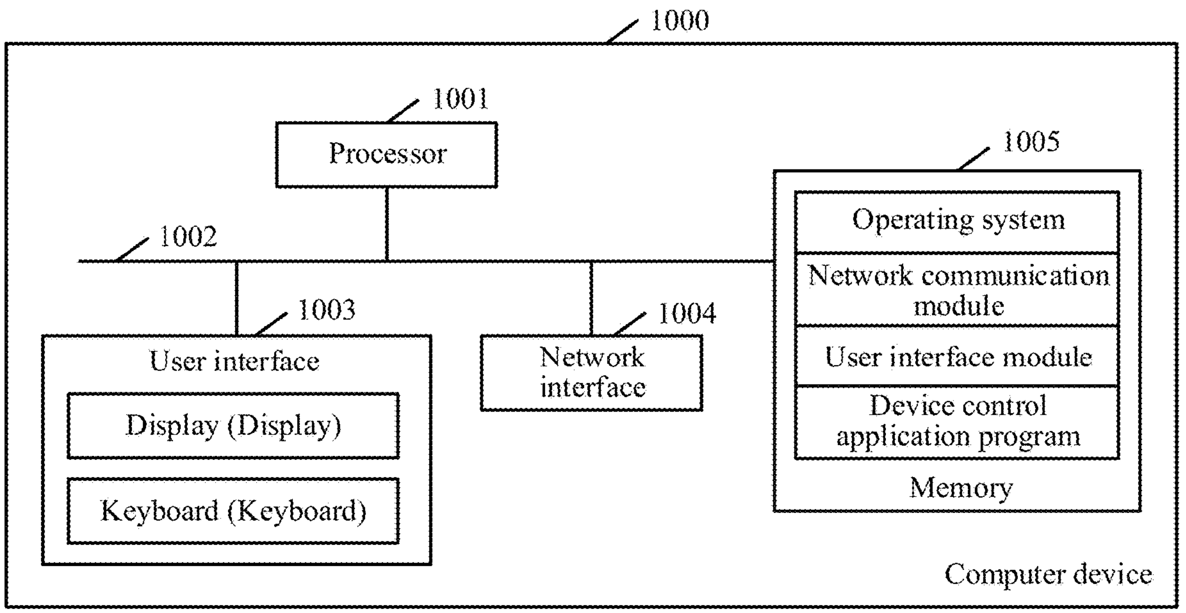
FIG. 10 is a schematic structural diagram of a computer device according to an embodiment of the present application.

Further, FIG. 10 is a schematic structural diagram of a computer device according to an embodiment of the present application. As shown in FIG. 10, the computer device 1000 may include: at least one processor 1001, for example, a CPU, at least one network interface 1004, a user interface 1003, a memory 1005, and at least one communications bus 1002. The communications bus 1002 is configured to implement connection and communication between these components. In some embodiments, the user interface 1003 may include a display and a keyboard. In an embodiment, the network interface 1004 may include a standard wired interface and wireless interface. The memory 1005 may be a high-speed RAM memory, or may be a non-volatile memory, for example, at least one magnetic disk memory. In an embodiment, the memory 1005 may be at least one storage apparatus located remotely from the foregoing processor 1001. As shown in FIG. 10, the memory 1005 used as a computer storage medium may include an operating system, a network communications module, a user interface module, and a device-control application program.

In the computer device 1000 shown in FIG. 10, the network interface 1004 may provide a network communication function. The user interface 1003 is mainly configured to provide an input interface for a user. The processor 1001 may be configured to invoke a device-control application program stored in the memory 1005, to perform the following operations:

creating a target stream-resource transfer channel for a stream-resource channel creation request in the blockchain based on a stream-resource transfer contract in the blockchain, the stream-resource channel creation request including a target object address pair, and the target stream-resource transfer channel providing, for the target object address pair, a function of performing stream-resource transfer based on the stream-resource transfer contract;

obtaining, in the blockchain according to the target object address pair, a historical stream-resource transfer channel including a historical object address pair, the target object address pair and the historical object address pair sharing at least one identical object address;

combining the historical stream-resource transfer channel and the target stream-resource transfer channel to obtain an update stream-resource transfer channel, the update stream-resource transfer channel including an update object address pair; and performing, according to the update stream-resource transfer channel, stream-resource transfer processing associated with the update object address pair.

The computer device 1000 described in this embodiment of the present application may execute the descriptions of the data processing method or apparatus based on a blockchain in the above embodiments. Details are not described again herein. In addition, the description of beneficial effects of the same method are not described herein again.

An embodiment of the present application further provides a computer-readable storage medium. The computer-readable storage medium stores a computer program. When the computer program is executed by a processor, the descriptions of the data processing method or apparatus based on a blockchain in the above embodiments are implemented. Details are not described again herein. In addition, the description of beneficial effects of the same method are not described herein again.

The computer-readable storage medium may be the data processing apparatus based on a blockchain in any one of the above embodiments or an internal storage unit of the computer device, such as a hard disk or a memory of the computer device. The computer-readable storage medium may also be an external storage device of the computer device, such as a plug-in hard disk equipped on the computer device, a smart media card (SMC), a secure digital (SD) card, a flash card, or the like. Further, the computer readable storage medium may also include both the internal storage unit and the external storage device of the computer device. The computer-readable storage medium is configured to store the computer program and other programs and data required by the computer device. The computer-readable storage medium may also be configured to temporarily store data that has been output or will be output.

An embodiment of the present application further provides a computer program product, including computer programs, and the computer programs being stored in a computer-readable storage medium. The processor of the computer device reads the computer program from the computer-readable storage medium, and the processor executes the computer program, so that the computer device may execute the descriptions of the data processing method or apparatus based on a blockchain in the above embodiments. Details are not described again herein. In addition, the description of beneficial effects of the same method are not described herein again.

In the specification and claims and the accompanying drawings of the embodiments of the present application, the terms such as "first" and "second" are used to distinguish between different objects, but are not used to describe a particular sequence of the objects. In addition, the terms "include" and any variant thereof are intended to cover a non-exclusive inclusion. For example, a process, method, apparatus, product, or device that includes a series of operations or units is not limited to the listed operations or modules; and instead, further includes an operation or module that is not listed in an embodiment, or further includes another operation or unit that is intrinsic to the process, method, apparatus, product, or device in an embodiment.

The term module (and other similar terms such as submodule, unit, subunit, etc.) in the present disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

A person of ordinary skill in the art may understand that, units and algorithm operations of the examples described in the foregoing disclosed embodiments may be implemented by electronic hardware, computer software, or a combination thereof. To clearly describe the interchangeability between the hardware and the software, the foregoing has generally described compositions and operations of each example based on functions. Whether the functions are executed in a mode of hardware or software depends on particular applications and design constraint conditions of the technical solutions. A person skilled in the art may use different methods to implement the described functions for each particular application, but it is not considered that the implementation goes beyond the scope of the embodiments of the present application.

What is disclosed above is merely exemplary embodiments of the present application, and certainly is not intended to limit the scope of the claims of the present application. Therefore, equivalent variations made in accordance with the claims of the present application shall fall within the scope of the present application.

What is claimed is:

1. A data processing method based on a blockchain, performed by a computer device, comprising:

creating a target stream-resource transfer channel for a stream-resource channel creation request in the blockchain based on a stream-resource transfer contract in the blockchain, the stream-resource channel creation request comprising a target object address pair, and the target stream-resource transfer channel providing, for the target object address pair, a function of performing stream-resource transfer based on the stream-resource transfer contract;

obtaining, in the blockchain according to the target object address pair, a historical stream-resource transfer channel comprising a historical object address pair, the target object address pair and the historical object address pair sharing at least one identical object address;

combining the historical stream-resource transfer channel and the target stream-resource transfer channel to obtain an update stream-resource transfer channel, the update stream-resource transfer channel comprising an update object address pair; and performing, according to the update stream-resource transfer channel, stream-resource transfer processing associated with the update object address pair.

2. The method according to claim 1, further comprising:

obtaining the stream-resource channel creation request initiated by a first target object address; the target object address pair comprising the first target object address having a stream-resource transfer-out attribute;

calling the stream-resource transfer contract in the blockchain according to the stream-resource channel creation request;

when the target stream-resource transfer channel is successfully created, determining, based on the stream-resource transfer contract, a target stream-resource corresponding to the target stream-resource transfer channel; and transferring the target stream-resource from the first target object address to a contract address of the stream-resource transfer contract.

3. The method according to claim 1, wherein the target object address pair comprises a first target object address having a stream-resource transfer-out attribute, and a second target object address having a stream-resource transfer-in attribute; the historical object address pair comprises a first historical object address pair, a second historical object address pair, and a third historical object address pair; and obtaining, in the blockchain according to the target object address pair, the historical stream-resource transfer channel comprising the historical object address pair comprises:

obtaining, in the blockchain, a first stream-resource transfer channel comprising the first historical object address pair; wherein the first historical object address pair comprises a first historical object address that has the stream-resource transfer-in attribute and that is same as the first target object address;

obtaining, in the blockchain, a second stream-resource transfer channel comprising the second historical object address pair; wherein the second historical object address pair comprises a second historical object address that has the stream-resource transfer-out attribute and that is same as the second target object address;

obtaining, in the blockchain, a third stream-resource transfer channel comprising the third historical object address pair; wherein the third historical object address pair is same as the target object address pair; and determining at least one of the first stream-resource transfer channel, the second stream-resource transfer channel, and the third stream-resource transfer channel as the historical stream-resource transfer channel.

4. The method according to claim 1, wherein combining the historical stream-resource transfer channel and the target stream-resource transfer channel to obtain the update stream-resource transfer channel comprises:

determining a historical stream-resource transfer rate of the historical stream-resource transfer channel, and determining a target stream-resource transfer rate of the target stream-resource transfer channel; and combining the historical stream-resource transfer channel and the target stream-resource transfer channel according to the target object address pair, the historical object address pair, the historical stream-resource transfer rate, and the target stream-resource transfer rate, to obtain the update stream-resource transfer channel.

5. The method according to claim 4, wherein combining the historical stream-resource transfer channel and the target stream-resource transfer channel according to the target object address pair, the historical object address pair, the historical stream-resource transfer rate, and the target stream-resource transfer rate, to obtain the update stream-resource transfer channel comprises:

obtaining a first target object address having a stream-resource transfer-out attribute, and a second target object address having a stream-resource transfer-in attribute in the target object address pair;

obtaining a third historical object address having the stream-resource transfer-out attribute and a fourth historical object address having the stream-resource transfer-in attribute in the historical object address pair;

comparing the historical stream-resource transfer rate with the target stream-resource transfer rate in response to the first target object address being the same as the fourth historical object address, and the second target object address being the same as the third historical object address;

setting a transfer state of the target stream-resource transfer channel to a stop transfer state in response to the historical stream-resource transfer rate being greater than the target stream-resource transfer rate;

determining a first stream-resource transfer rate difference between the historical stream-resource transfer rate and the target stream-resource transfer rate, and updating the historical stream-resource transfer rate of the historical stream-resource transfer channel to the first stream-resource transfer rate difference; and generating the update stream-resource transfer channel according to the historical stream-resource transfer channel updated to the first stream-resource transfer rate difference and the target stream-resource transfer channel set to the stop transfer state.

6. The method according to claim 5, wherein setting the transfer state of the target stream-resource transfer channel to the stop transfer state comprises:

obtaining a first end timestamp of the target stream-resource transfer channel, and obtaining a second end timestamp of the historical stream-resource transfer channel;

setting the transfer state of the target stream-resource transfer channel in a first time period to the stop transfer state in response to the second end timestamp being less than the first end timestamp; wherein the maximum timestamp of the first time period is the second end timestamp; and setting the transfer state of the target stream-resource transfer channel in a second time period to a continuous transfer state, and maintaining the target stream-resource transfer rate of the target stream-resource transfer channel in the second time period; wherein the maximum timestamp of the second time period is the first end timestamp, and the second time period and the first time period are adjacent time periods; and generating the update stream-resource transfer channel according to the historical stream-resource transfer channel updated to the first stream-resource transfer rate difference and the target stream-resource transfer channel set to the stop transfer state comprises:

generating the update stream-resource transfer channel according to the historical stream-resource transfer channel updated to the first stream-resource transfer rate difference, the target stream-resource transfer channel that is in the first time period and that is set to the stop transfer state, and the target stream-resource transfer channel that is in the second time period and that maintains the target stream-resource transfer rate.

7. The method according to claim 5, wherein updating the historical stream-resource transfer rate of the historical stream-resource transfer channel to the first stream-resource transfer rate difference comprises:

obtaining a second end timestamp of the history stream-resource transfer channel, and obtaining a first end timestamp of the target stream-resource transfer channel;

updating the historical stream-resource transfer rate of the historical stream-resource transfer channel in a third time period to the first stream-resource transfer rate difference in response to the second end timestamp being greater than the first end timestamp; wherein the maximum timestamp of the third time period is the second end timestamp; and maintaining the historical stream-resource transfer rate of the historical stream-resource transfer channel in the fourth time period; wherein the minimum timestamp of the fourth time period is greater than the second end timestamp, and the fourth time period and the third time period are adjacent time periods; and generating the update stream-resource transfer channel according to the historical stream-resource transfer channel updated to the first stream-resource transfer rate difference and the target stream-resource transfer channel set to the stop transfer state comprises:

generating the update stream-resource transfer channel according to the historical stream-resource transfer channel that is in the third time period and that is updated to the first stream-resource transfer rate difference, the historical stream-resource transfer channel that is in the fourth time period and that maintains the historical stream-resource transfer rate, and the target stream-resource transfer channel set to the stop transfer state.

8. The method according to claim 4, wherein combining the historical stream-resource transfer channel and the target stream-resource transfer channel according to the target object address pair, the historical object address pair, the historical stream-resource transfer rate, and the target stream-resource transfer rate, to obtain the update stream-resource transfer channel comprises:

obtaining a first target object address having a stream-resource transfer-out attribute, and a second target object address having a stream-resource transfer-in attribute in the target object address pair;

obtaining a fifth historical object address having the stream-resource transfer-out attribute and a sixth historical object address having the stream-resource transfer-in attribute in the historical object address pair;

setting the transfer state of the target stream-resource transfer channel to the stop transfer state in response to the first target object address being the same as the fifth historical object address, and the second target object address being the same as the sixth historical object address;

determining a stream-resource transfer rate sum of the historical stream-resource transfer rate and the target stream-resource transfer rate, and updating the historical stream-resource transfer rate of the historical stream-resource transfer channel to the stream-resource transfer rate sum; and generating the update stream-resource transfer channel according to the historical stream-resource transfer channel updated to the stream-resource transfer rate sum and the target stream-resource transfer channel set to the stop transfer state.

9. The method according to claim 8, wherein updating the historical stream-resource transfer rate of the historical stream-resource transfer channel to the stream-resource transfer rate sum comprises:

obtaining a first end timestamp of the target stream-resource transfer channel, and obtaining a third end timestamp of the historical stream-resource transfer channel;

updating the historical stream-resource transfer rate of the historical stream-resource transfer channel in a fifth time period to the stream-resource transfer rate sum in response to the third end timestamp being less than the first end timestamp; wherein the maximum timestamp of the fifth time period is the third end timestamp; and updating the historical stream-resource transfer rate of the historical stream-resource transfer channel in a sixth time period to the target stream-resource transfer rate; wherein the maximum timestamp of the sixth time period is the first end timestamp, and the sixth time period and the fifth time period are adjacent time periods; and generating the update stream-resource transfer channel according to the historical stream-resource transfer channel updated to the stream-resource transfer rate sum and the target stream-resource transfer channel set to the stop transfer state comprises:

generating the update stream-resource transfer channel according to the historical stream-resource transfer channel that is in the fifth time period and that is updated to the stream-resource transfer rate sum, the historical stream-resource transfer channel that is in the sixth time period and that is updated to the target stream-resource transfer rate, and the target stream-resource transfer channel set to the stop transfer state.

10. The method according to claim 4, wherein combining the historical stream-resource transfer channel and the target stream-resource transfer channel according to the target object address pair, the historical object address pair, the historical stream-resource transfer rate, and the target stream-resource transfer rate, to obtain the update stream-resource transfer channel comprises:

obtaining a first target object address having a stream-resource transfer-out attribute, and a second target object address having a stream-resource transfer-in attribute in the target object address pair;

obtaining a seventh historical object address having the stream-resource transfer-out attribute, and an eighth historical object address having the stream-resource transfer-in attribute in the historical object address pair;

comparing the historical stream-resource transfer rate with the target stream-resource transfer rate in response to the first target object address being the same as the eighth historical object address, and the second target object address being different from the seventh historical object address;

determining a second stream-resource transfer rate difference between the historical stream-resource transfer rate and the target stream-resource transfer rate in response to the historical stream-resource transfer rate being greater than the target stream-resource transfer rate, and updating the historical stream-resource transfer rate of the historical stream-resource transfer channel to the second stream-resource transfer rate difference;

updating the first target object address in the target stream-resource transfer channel to the seventh historical object address; and generating the update stream-resource transfer channel according to the historical stream-resource transfer channel updated to the second stream-resource transfer rate difference and the target stream-resource transfer channel updated to the seventh historical object address.

11. The method according to claim 10, wherein updating the historical stream-resource transfer rate of the historical stream-resource transfer channel to the second stream-resource transfer rate difference comprises:

obtaining a first end timestamp of the target stream-resource transfer channel, and obtaining a fourth end timestamp of the historical stream-resource transfer channel;

updating the historical stream-resource transfer rate of the historical stream-resource transfer channel in a seventh time period to the second stream-resource transfer rate difference in response to the fourth end timestamp being greater than the first end timestamp; wherein the maximum timestamp of the seventh time period is the first end timestamp; and maintaining the historical stream-resource transfer rate of the historical stream-resource transfer channel in the eighth time period; wherein the maximum timestamp of the eighth time period is the fourth end timestamp, and the eighth time period and the seventh time period are adjacent time periods; and generating the update stream-resource transfer channel according to the historical stream-resource transfer channel updated to the second stream-resource transfer rate difference and the target stream-resource transfer channel updated to the seventh historical object address comprises:

generating the update stream-resource transfer channel according to the historical stream-resource transfer channel that is in the seventh time period and that is updated to the second stream-resource transfer rate difference, the historical stream-resource transfer channel that is in the eighth time period and that maintains the historical stream-resource transfer rate, and the target stream-resource transfer channel updated to the seventh historical object address.

12. The method according to claim 10, wherein updating the first target object address in the target stream-resource transfer channel to the seventh historical object address comprises:

obtaining a first end timestamp of the target stream-resource transfer channel, and obtaining a fourth end timestamp of the historical stream-resource transfer channel;

updating the first target object address in the target stream-resource transfer channel in the ninth time period to the seventh historical object address in response to the fourth end timestamp being less than the first end timestamp; wherein the maximum timestamp of the ninth time period is the fourth end timestamp; and maintaining the first target object address of the target stream-resource transfer channel in a tenth time period; wherein the maximum timestamp of the tenth time period is the first end timestamp, and the tenth time period and the ninth time period are adjacent time periods; and generating the update stream-resource transfer channel according to the historical stream-resource transfer channel updated to the second stream-resource transfer rate difference and the target stream-resource transfer channel updated to the seventh historical object address comprises:

generating the update stream-resource transfer channel according to the historical stream-resource transfer channel updated to the second stream-resource transfer rate difference, the target stream-resource transfer channel that is in the ninth time period and that is updated to the seventh historical object address, and the target stream-resource transfer channel that is in the tenth time period and that maintains the first target object address.

13. The method according to claim 4, wherein combining the historical stream-resource transfer channel and the target stream-resource transfer channel according to the target object address pair, the historical object address pair, the historical stream-resource transfer rate, and the target stream-resource transfer rate, to obtain the update stream-resource transfer channel comprises:

obtaining a first target object address having a stream-resource transfer-out attribute, and a second target object address having a stream-resource transfer-in attribute in the target object address pair;

obtaining a ninth historical object address having the stream-resource transfer-out attribute and a tenth historical object address having the stream-resource transfer-in attribute in the historical object address pair;

comparing the historical stream-resource transfer rate with the target stream-resource transfer rate in response to the first target object address being different from the tenth historical object address, and the second target object address being the same as the ninth historical object address;

determining a third stream-resource transfer rate difference between the historical stream-resource transfer rate and the target stream-resource transfer rate in response to the historical stream-resource transfer rate being greater than the target stream-resource transfer rate, and updating the historical stream-resource transfer rate of the historical stream-resource transfer channel to the third stream-resource transfer rate difference;

updating the second target object address in the target stream-resource transfer channel to the tenth historical object address; and generating the update stream-resource transfer channel according to the historical stream-resource transfer channel updated to the third stream-resource transfer rate difference and the target stream-resource transfer channel updated to the tenth historical object address.

14. The method according to claim 13, wherein updating the historical stream-resource transfer rate of the historical stream-resource transfer channel to the third stream-resource transfer rate difference comprises:

obtaining a first end timestamp of the target stream-resource transfer channel, and obtaining a fifth end timestamp of the historical stream-resource transfer channel;

updating the historical stream-resource transfer rate of the historical stream-resource transfer channel in an eleventh time period to the third stream-resource transfer rate difference in response to the fifth end timestamp being greater than the first end timestamp; wherein the maximum timestamp of the eleventh time period is the first end timestamp; and maintaining the historical stream-resource transfer rate of the historical stream-resource transfer channel in a twelfth time period; wherein the maximum timestamp of the twelfth time period is the fifth end timestamp, and the twelfth time period and the eleventh time period are adjacent time periods; and generating the update stream-resource transfer channel according to the historical stream-resource transfer channel updated to the third stream-resource transfer rate difference and the target stream-resource transfer channel updated to the tenth historical object address comprises:

generating the update stream-resource transfer channel according to the historical stream-resource transfer channel that is in the eleventh time period and that is updated to the third stream-resource transfer rate difference, the historical stream-resource transfer channel that is in the twelfth time period and that maintains the historical stream-resource transfer rate, and the target stream-resource transfer channel updated to the tenth historical object address.

15. The method according to claim 13, wherein updating the second target object address in the target stream-resource transfer channel to the tenth historical object address comprises:

obtaining a first end timestamp of the target stream-resource transfer channel, and obtaining a fifth end timestamp of the historical stream-resource transfer channel;

updating the second target object address in the target stream-resource transfer channel in a thirteenth time period to the tenth historical object address in response to the fifth end timestamp being less than the first end timestamp; wherein the maximum timestamp of the thirteenth time period is the fifth end timestamp; and maintaining the second target object address of the target stream-resource transfer channel in a fourteenth time period; wherein the maximum timestamp of the fourteenth time period is the first end timestamp, and the fourteenth time period and the thirteenth time period are adjacent time periods; and generating the update stream-resource transfer channel according to the historical stream-resource transfer channel updated to the third stream-resource transfer rate difference and the target stream-resource transfer channel updated to the tenth historical object address comprises:

generating the update stream-resource transfer channel according to the historical stream-resource transfer channel updated to the third stream-resource transfer rate difference, the target stream-resource transfer channel that is in the thirteenth time period and that is updated to the tenth historical object address, and the target stream-resource transfer channel that is in the fourteenth time period and that maintains the second target object address.

16. The method according to claim 4, further comprising:

in response to a transfer rate unit of the historical stream-resource transfer rate being different from a transfer rate unit of the target stream-resource transfer rate, adjusting the historical stream-resource transfer rate according to the transfer rate unit of the target stream-resource transfer rate, to obtain an adjusted stream-resource transfer rate; wherein a transfer rate unit of the adjusted stream-resource transfer rate is the same as the transfer rate unit of the target stream-resource transfer rate; and combining the historical stream-resource transfer channel and the target stream-resource transfer channel according to the target object address pair, the historical object address pair, the historical stream-resource transfer rate, and the target stream-resource transfer rate, to obtain the update stream-resource transfer channel comprises:

combining the historical stream-resource transfer channel and the target stream-resource transfer channel according to the target object address pair, the historical object address pair, the adjusted stream-resource transfer rate, and the target stream-resource transfer rate, to obtain the update stream-resource transfer channel.

17. A computer device, comprising: at least one processor, a memory, and a network interface;

the at least one processor being connected to the memory and the network interface, the network interface being configured to provide a data communication function, the memory being configured to store computer programs, and the at least one processor being configured to call the computer programs so that the computer device performs:

creating a target stream-resource transfer channel for a stream-resource channel creation request in the blockchain based on a stream-resource transfer contract in the blockchain, the stream-resource channel creation request comprising a target object address pair, and the target stream-resource transfer channel providing, for the target object address pair, a function of performing stream-resource transfer based on the stream-resource transfer contract;

obtaining, in the blockchain according to the target object address pair, a historical stream-resource transfer channel comprising a historical object address pair, the target object address pair and the historical object address pair sharing at least one identical object address;

combining the historical stream-resource transfer channel and the target stream-resource transfer channel to obtain an update stream-resource transfer channel, the update stream-resource transfer channel comprising an update object address pair; and performing, according to the update stream-resource transfer channel, stream-resource transfer processing associated with the update object address pair.

18. The device according to claim 17, wherein the at least one processor is further configured to perform:

obtaining the stream-resource channel creation request initiated by a first target object address; the target object address pair comprising the first target object address having a stream-resource transfer-out attribute;

calling the stream-resource transfer contract in the blockchain according to the stream-resource channel creation request;

when the target stream-resource transfer channel is successfully created, determining, based on the stream-resource transfer contract, a target stream-resource corresponding to the target stream-resource transfer channel; and transferring the target stream-resource from the first target object address to a contract address of the stream-resource transfer contract.

19. The device according to claim 17, wherein the target object address pair comprises a first target object address having a stream-resource transfer-out attribute, and a second target object address having a stream-resource transfer-in attribute; the historical object address pair comprises a first historical object address pair, a second historical object address pair, and a third historical object address pair; and the at least one processor is further configured to perform:

obtaining, in the blockchain, a first stream-resource transfer channel comprising the first historical object address pair; wherein the first historical object address pair comprises a first historical object address that has the stream-resource transfer-in attribute and that is same as the first target object address;

obtaining, in the blockchain, a second stream-resource transfer channel comprising the second historical object address pair; wherein the second historical object address pair comprises a second historical object address that has the stream-resource transfer-out attribute and that is same as the second target object address;

obtaining, in the blockchain, a third stream-resource transfer channel comprising the third historical object address pair; wherein the third historical object address pair is same as the target object address pair; and determining at least one of the first stream-resource transfer channel, the second stream-resource transfer channel, and the third stream-resource transfer channel as the historical stream-resource transfer channel.

20. A non-transitory computer-readable storage medium storing computer programs that, when being executed, causes the at least one processor to perform:

creating a target stream-resource transfer channel for a stream-resource channel creation request in the blockchain based on a stream-resource transfer contract in the blockchain, the stream-resource channel creation request comprising a target object address pair, and the target stream-resource transfer channel providing, for the target object address pair, a function of performing stream-resource transfer based on the stream-resource transfer contract;

obtaining, in the blockchain according to the target object address pair, a historical stream-resource transfer channel comprising a historical object address pair, the target object address pair and the historical object address pair sharing at least one identical object address;

combining the historical stream-resource transfer channel and the target stream-resource transfer channel to obtain an update stream-resource transfer channel, the update stream-resource transfer channel comprising an update object address pair; and performing, according to the update stream-resource transfer channel, stream-resource transfer processing associated with the update object address pair.

* * * * *